United States Patent
Thomas et al.

(10) Patent No.: US 10,048,744 B2
(45) Date of Patent: Aug. 14, 2018

(54) APPARATUS AND METHOD FOR THERMAL MANAGEMENT IN A MULTI-CHIP PACKAGE

(71) Applicant: Intel Corporation, Santa Clara, CA (US)

(72) Inventors: Tessil Thomas, Cambridge (GB); Phani Kumar Kandula, Bangalore (IN); Ramamurthy Krithivas, Chandler, AZ (US); Howard Chin, Westford, MA (US); Ian M. Steiner, Hillsboro, OR (US); Vivek Garg, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 330 days.

(21) Appl. No.: 14/554,384

(22) Filed: Nov. 26, 2014

(65) Prior Publication Data
US 2016/0147291 A1    May 26, 2016

(51) Int. Cl.
G06F 1/32    (2006.01)
G06F 1/20    (2006.01)

(52) U.S. Cl.
CPC ............ *G06F 1/3296* (2013.01); *G06F 1/206* (2013.01); *G06F 1/324* (2013.01); *G06F 1/3206* (2013.01); *G06F 1/32* (2013.01); *Y02D 10/126* (2018.01); *Y02D 10/16* (2018.01); *Y02D 10/172* (2018.01)

(58) Field of Classification Search
CPC ....... G06F 1/3206; G06F 1/206; G06F 1/3296
See application file for complete search history.

(56) References Cited

U.S. PATENT DOCUMENTS

| 5,163,153 | A | 11/1992 | Cole et al. |
| 5,522,087 | A | 5/1996 | Hsiang |
| 5,590,341 | A | 12/1996 | Matter |
| 5,621,250 | A | 4/1997 | Kim |
| 5,931,950 | A | 8/1999 | Hsu |

(Continued)

FOREIGN PATENT DOCUMENTS

EP    1 282 030 A1    5/2003

OTHER PUBLICATIONS

MCC Small Area Network Specialists, "What is an Open-Collector/OPen-Drain Circuit?" 2009, 1 page, http://mcc-us.com/Open-collectorFAQ.htm.

(Continued)

*Primary Examiner* — Kim Huynh
*Assistant Examiner* — Kevin Stewart
(74) *Attorney, Agent, or Firm* — Trop, Pruner & Hu, P.C.

(57) ABSTRACT

In an embodiment, a processor includes a first chip of a multi-chip package (MCP). The first chip includes at least one core and first chip temperature control (TC) logic to assert a first power adjustment signal at a second chip of the MCP responsive to an indication that a first chip temperature of the first chip exceeds a first threshold. The processor also includes a conduit that includes a bi-directional pin to couple the first chip to the second chip within the MCP. The conduit is to transport the first power adjustment signal from the first chip to the second chip and the first power adjustment signal is to cause an adjustment of a second chip power consumption of the second chip. Other embodiments are described and claimed.

20 Claims, 19 Drawing Sheets

(56) References Cited

U.S. PATENT DOCUMENTS

| | | |
|---|---|---|
| 6,748,546 B1 | 6/2004 | Mirov et al. |
| 6,792,392 B1 | 9/2004 | Knight |
| 6,823,516 B1 | 11/2004 | Cooper |
| 6,829,713 B2 | 12/2004 | Cooper et al. |
| 6,996,728 B2 | 2/2006 | Singh |
| 7,010,708 B2 | 3/2006 | Ma |
| 7,043,649 B2 | 5/2006 | Terrell |
| 7,093,147 B2 | 8/2006 | Farkas et al. |
| 7,111,179 B1 | 9/2006 | Girson et al. |
| 7,194,643 B2 | 3/2007 | Gonzalez et al. |
| 7,272,730 B1 | 9/2007 | Acquaviva et al. |
| 7,412,615 B2 | 8/2008 | Yokota et al. |
| 7,434,073 B2 | 10/2008 | Magklis |
| 7,437,270 B2 | 10/2008 | Song et al. |
| 7,454,632 B2 | 11/2008 | Kardach et al. |
| 7,529,956 B2 | 5/2009 | Stufflebeam |
| 7,539,885 B2 | 5/2009 | Ma |
| 7,730,340 B2 | 6/2010 | Hu et al. |
| 9,423,822 B1* | 8/2016 | Singh .................. G06F 1/12 |
| 2001/0044909 A1 | 11/2001 | Oh et al. |
| 2002/0194509 A1 | 12/2002 | Plante et al. |
| 2003/0061383 A1 | 3/2003 | Zilka |
| 2004/0064752 A1 | 4/2004 | Kazachinsky et al. |
| 2004/0098560 A1 | 5/2004 | Storvik et al. |
| 2004/0133816 A1* | 7/2004 | Miyairi ................ G06F 1/3203 |
| | | 713/300 |
| 2004/0139356 A1 | 7/2004 | Ma |
| 2004/0268166 A1 | 12/2004 | Farkas et al. |
| 2005/0022038 A1 | 1/2005 | Kaushik et al. |
| 2005/0033881 A1 | 2/2005 | Yao |
| 2005/0132238 A1 | 6/2005 | Nanja |
| 2006/0050670 A1 | 3/2006 | Hillyard et al. |
| 2006/0053326 A1 | 3/2006 | Naveh |
| 2006/0059286 A1 | 3/2006 | Bertone et al. |
| 2006/0069936 A1 | 3/2006 | Lint et al. |
| 2006/0117202 A1 | 6/2006 | Magklis et al. |
| 2006/0184287 A1 | 8/2006 | Belady et al. |
| 2007/0005995 A1 | 1/2007 | Kardach et al. |
| 2007/0016817 A1 | 1/2007 | Albonesi et al. |
| 2007/0079294 A1 | 4/2007 | Knight |
| 2007/0106827 A1 | 5/2007 | Boatright et al. |
| 2007/0156370 A1* | 7/2007 | White .................. G06F 1/206 |
| | | 702/132 |
| 2007/0156992 A1 | 7/2007 | Jahagirdar |
| 2007/0192641 A1* | 8/2007 | Nagendra ............ G06F 1/3203 |
| | | 713/320 |
| 2007/0214342 A1 | 9/2007 | Newburn |
| 2007/0239398 A1 | 10/2007 | Song et al. |
| 2007/0245163 A1 | 10/2007 | Lu et al. |
| 2008/0028240 A1 | 1/2008 | Arai et al. |
| 2008/0250260 A1 | 10/2008 | Tomita |
| 2009/0006871 A1 | 1/2009 | Liu et al. |
| 2009/0150695 A1 | 6/2009 | Song et al. |
| 2009/0150696 A1 | 6/2009 | Song et al. |
| 2009/0158061 A1 | 6/2009 | Schmitz et al. |
| 2009/0158067 A1 | 6/2009 | Bodas et al. |
| 2009/0172375 A1 | 7/2009 | Rotem et al. |
| 2009/0172428 A1 | 7/2009 | Lee |
| 2009/0235105 A1 | 9/2009 | Branover et al. |
| 2010/0115309 A1 | 5/2010 | Carvalho et al. |
| 2010/0146513 A1 | 6/2010 | Song |
| 2010/0191997 A1 | 7/2010 | Dodeja et al. |
| 2011/0090640 A1* | 4/2011 | Samson ................ G06F 1/206 |
| | | 361/679.46 |
| 2011/0154090 A1 | 6/2011 | Dixon et al. |
| 2012/0072749 A1* | 3/2012 | Conroy ................ G06F 1/324 |
| | | 713/322 |
| 2012/0079290 A1 | 3/2012 | Kumar |
| 2012/0246506 A1 | 9/2012 | Knight |
| 2013/0061064 A1 | 3/2013 | Ananthakrishnan et al. |
| 2013/0080803 A1 | 3/2013 | Ananthakrishnan et al. |
| 2013/0080804 A1 | 3/2013 | Ananthakrishnan et al. |
| 2013/0111120 A1 | 5/2013 | Ananthakrishnan et al. |
| 2013/0111121 A1 | 5/2013 | Ananthakrishnan et al. |
| 2013/0111226 A1 | 5/2013 | Ananthakrishnan et al. |
| 2013/0111236 A1 | 5/2013 | Ananthakrishnan et al. |
| 2013/0145180 A1* | 6/2013 | Branover .................. G06F 1/00 |
| | | 713/300 |
| 2013/0246820 A1* | 9/2013 | Branover .............. G06F 1/3296 |
| | | 713/320 |
| 2013/0346774 A1 | 12/2013 | Bhandaru et al. |
| 2014/0068290 A1 | 3/2014 | Bhandaru et al. |
| 2014/0119595 A1* | 5/2014 | Gallo .................... G06T 3/0081 |
| | | 382/103 |
| 2014/0181352 A1 | 6/2014 | Conrad et al. |
| 2014/0195829 A1 | 7/2014 | Bhandaru et al. |
| 2014/0208141 A1 | 7/2014 | Bhandaru et al. |
| 2015/0006925 A1* | 1/2015 | Branover .............. G06F 1/3206 |
| | | 713/320 |

OTHER PUBLICATIONS

Intel Developer Forum, IDF2010, Opher Kahn, et al., "Intel Next Generation Microarchitecture Codename Sandy Bridge: New Processor Innovations," Sep. 13, 2010, 58 pages.

SPEC-Power and Performance, Design Overview V1.10, Standard Performance Information Corp., Oct. 21, 2008, 6 pages.

Intel Technology Journal, "Power and Thermal Management in the Intel Core Duo Processor," May 15, 2006, pp. 109-122.

Anoop Iyer, et al., "Power and Performance Evaluation of Globally Asynchronous Locally Synchronous Processor," 2002, pp. 1-11.

Greg Semeraro, et al., "Hiding Synchronization Delays in A GALS Processor Microarchitecture," 2004, pp. 1-13.

Joan-Manuel Parcerisa, et al., "Efficient Interconnects for Clustered Microarchitectures," 2002, pp. 1-10.

Grigorios Magklis, et al., "Profile-Based Dynamic Voltage and Frequency Scalling for a Multiple Clock Domain Microprocessor," 2003, pp. 1-12.

Greg Semeraro, et al., "Dynamic Frequency and Voltage Control for a Multiple Clock Domain Architecture," 2002, pp. 1-12.

Greg Semeraro, "Energy-Efficient Processor Design Using Multiple Clock Domains with Dynamic Voltage and Frequency Scaling," 2002, pp. 29-40.

Diana Marculescu, "Application Adaptive Energy Efficient Clustered Architectures," 2004, pp. 344-349.

L. Benini, et al., "System-Level Dynamic Power Management," 1999, pp. 23-31.

Ravindra Jejurikar, et al., "Leakage Aware Dynamic Voltage Scaling for Real-Time Embedded Systems," 2004, pp. 275-280.

Ravindra Jejurikar, et al., "Dynamic Slack Reclamation With Procrastination Scheduling in Real-Time Embedded Systems," 2005, pp. 13-17.

R. Todling, et al., "Some Strategies for Kalman Filtering and Smoothing," 1996, pp. 1-21.

R.E. Kalman, "A New Approach to Linear Filtering and Prediction Problems," 1960, pp. 1-12.

Intel Corporation, "Intel 64 and IA-32 Architectures Software Developer's Manual," vol. 3 (3A, 3B & 3C): System Programming Guide, Feb. 2014, Chapter 14 Power and Thermal Management (14.1-14.9.5), 44 pages.

* cited by examiner

APPARATUS AND METHOD FOR THERMAL MANAGEMENT IN A MULTI-CHIP PACKAGE

TECHNICAL FIELD

Embodiments relate to power management of a system.

BACKGROUND

Advances in semiconductor processing and logic design have permitted an increase in the amount of logic that may be present on integrated circuit devices. As a result, computer system configurations have evolved from a single or multiple integrated circuits in a system to multiple hardware threads, multiple cores, multiple devices, and/or complete systems on individual integrated circuits. Additionally, as the density of integrated circuits has grown, the power requirements for computing systems (from embedded systems to servers) have also escalated. Furthermore, software inefficiencies, and its requirements of hardware, have also caused an increase in computing device energy consumption. In fact, some studies indicate that computing devices consume a sizeable percentage of the entire electricity supply for a country, such as the United States of America. As a result, there is a vital need for energy efficiency and conservation associated with integrated circuits. These needs will increase as servers, desktop computers, notebooks, Ultrabooks™, tablets, mobile phones, processors, embedded systems, etc. become even more prevalent (from inclusion in the typical computer, automobiles, and televisions to biotechnology).

DETAILED DESCRIPTION

Although the following embodiments are described with reference to energy conservation and energy efficiency in specific integrated circuits, such as in computing platforms or processors, other embodiments are applicable to other types of integrated circuits and logic devices. Similar techniques and teachings of embodiments described herein may be applied to other types of circuits or semiconductor devices that may also benefit from better energy efficiency and energy conservation. For example, the disclosed embodiments are not limited to any particular type of computer systems. That is, disclosed embodiments can be used in many different system types, ranging from server computers (e.g., tower, rack, blade, micro-server and so forth), communications systems, storage systems, desktop computers of any configuration, laptop, notebook, and tablet computers (including 2:1 tablets, phablets and so forth), and may be also used in other devices, such as handheld devices, systems on chip (SoCs), and embedded applications. Some examples of handheld devices include cellular phones such as smartphones, Internet protocol devices, digital cameras, personal digital assistants (PDAs), and handheld PCs. Embedded applications may typically include a microcontroller, a digital signal processor (DSP), network computers (NetPC), set-top boxes, network hubs, wide area network (WAN) switches, wearable devices, or any other system that can perform the functions and operations taught below. More so, embodiments may be implemented in mobile terminals having standard voice functionality such as mobile phones, smartphones and phablets, and/or in non-mobile terminals without a standard wireless voice function communication capability, such as many wearables, tablets, notebooks, desktops, micro-servers, servers and so forth. Moreover, the apparatuses, methods, and systems described herein are not limited to physical computing devices, but may also relate to software optimizations for energy conservation and efficiency. As will become readily apparent in the description below, the embodiments of methods, apparatuses, and systems described herein (whether in reference to hardware, firmware, software, or a combination thereof) are vital to a 'green technology' future, such as for power conservation and energy efficiency in products that encompass a large portion of the US economy.

Figure 1:
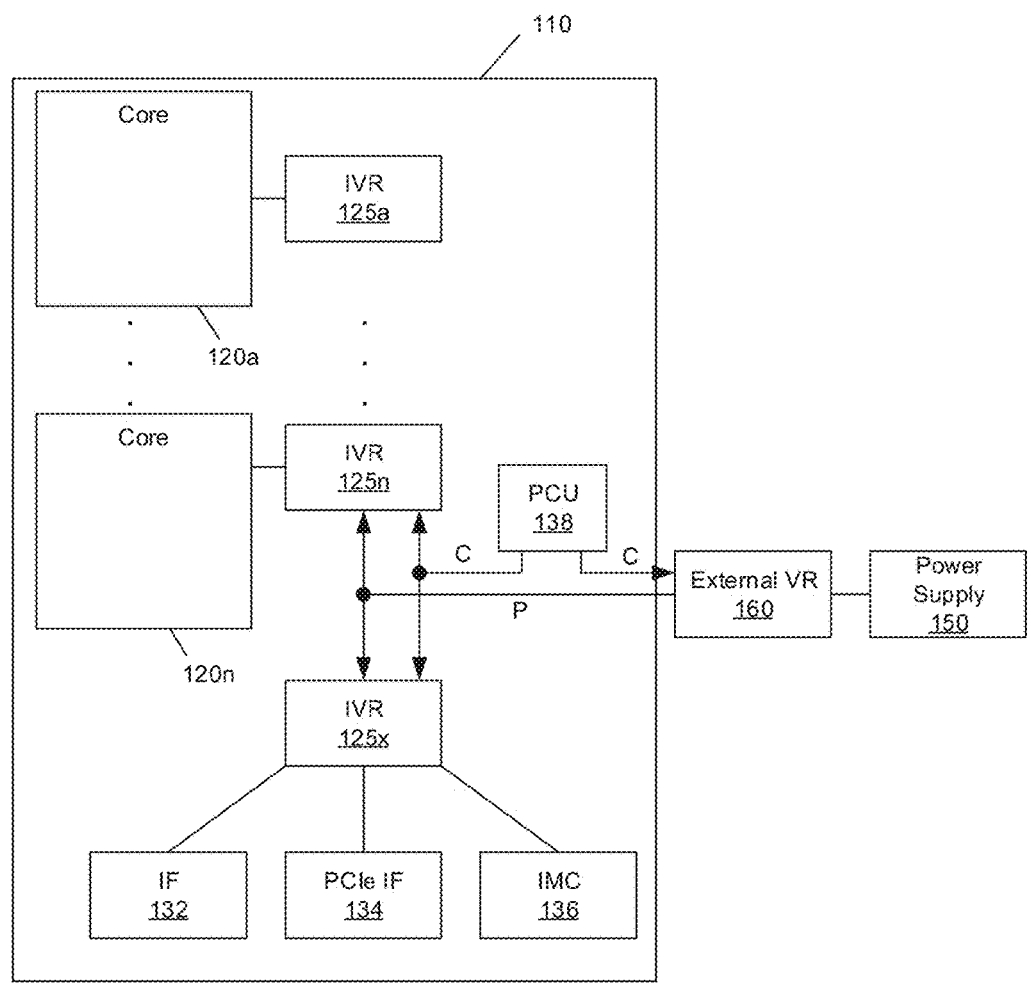
FIG. 1 is a block diagram of a portion of a system in accordance with an embodiment of the present invention.

Referring now to FIG. 1, shown is a block diagram of a portion of a system in accordance with an embodiment of the present invention. As shown in FIG. 1, system 100 may include various components, including a processor 110 which as shown is a multicore processor. Processor 110 may be coupled to a power supply 150 via an external voltage regulator 160, which may perform a first voltage conversion to provide a primary regulated voltage to processor 110.

As seen, processor 110 may be a single die processor including multiple cores $120_a$-$120_n$. In addition, each core may be associated with an integrated voltage regulator (IVR) $125_a$-$125_n$ which receives the primary regulated voltage and generates an operating voltage to be provided to one or more agents of the processor associated with the IVR. Accordingly, an IVR implementation may be provided to allow for fine-grained control of voltage and thus power and performance of each individual core. As such, each core can operate at an independent voltage and frequency, enabling great flexibility and affording wide opportunities for balancing power consumption with performance. In some embodiments, the use of multiple IVRs enables the grouping of components into separate power planes, such that power is regulated and supplied by the IVR to only those components in the group. During power management, a given power plane of one IVR may be powered down or off when the processor is placed into a certain low power state, while another power plane of another IVR remains active, or fully powered.

Still referring to FIG. 1, additional components may be present within the processor including an input/output interface 132, another interface 134, and an integrated memory controller 136. As seen, each of these components may be powered by another integrated voltage regulator $125_x$. In one embodiment, interface 132 may be enable operation for an Intel® Quick Path Interconnect (QPI) interconnect, which provides for point-to-point (PtP) links in a cache coherent protocol that includes multiple layers including a physical layer, a link layer and a protocol layer. In turn, interface 134 may communicate via a Peripheral Component Interconnect Express (PCIe™) protocol.

Also shown is a power control unit (PCU) 138, which may include hardware, software and/or firmware to perform power management operations with regard to processor 110. As seen, PCU 138 provides control information to external voltage regulator 160 via a digital interface to cause the voltage regulator to generate the appropriate regulated voltage. PCU 138 also provides control information to IVRs 125 via another digital interface to control the operating voltage generated (or to cause a corresponding IVR to be disabled in a low power mode). In various embodiments, PCU 138 may include a variety of power management logic units to perform hardware-based power management. Such power management may be wholly processor controlled (e.g., by various processor hardware, and which may be triggered by workload and/or power, thermal or other processor constraints) and/or the power management may be performed responsive to external sources (such as a platform or management power management source or system software).

While not shown for ease of illustration, understand that additional components may be present within processor 110 such as uncore logic, and other components such as internal memories, e.g., one or more levels of a cache memory hierarchy and so forth. Furthermore, while shown in the implementation of FIG. 1 with an integrated voltage regulator, embodiments are not so limited.

Note that the power management techniques described herein may be independent of and complementary to an operating system (OS)-based power management (OSPM) mechanism. According to one example OSPM technique, a processor can operate at various performance states or levels, so-called P-states, namely from P0 to PN. In general, the P1 performance state may correspond to the highest guaranteed performance state that can be requested by an OS. In addition to this P1 state, the OS can further request a higher performance state, namely a P0 state. This P0 state may thus be an opportunistic or turbo mode state in which, when power and/or thermal budget is available, processor hardware can configure the processor or at least portions thereof to operate at a higher than guaranteed frequency. In many implementations a processor can include multiple so-called bin frequencies above the P1 guaranteed maximum frequency, exceeding to a maximum peak frequency of the particular processor, as fused or otherwise written into the processor during manufacture. In addition, according to one OSPM mechanism, a processor can operate at various power states or levels. With regard to power states, an OSPM mechanism may specify different power consumption states, generally referred to as C-states, C0, C1 to Cn states. When a core is active, it runs at a C0 state, and when the core is idle it may be placed in a core low power state, also called a core non-zero C-state (e.g., C1-C6 states), with each C-state being at a lower power consumption level (such that C6 is a deeper low power state than C1, and so forth).

Understand that many different types of power management techniques may be used individually or in combination in different embodiments. As representative examples, a power controller may control the processor to be power managed by some form of dynamic voltage frequency scaling (DVFS) in which an operating voltage and/or operating frequency of one or more cores or other processor logic may be dynamically controlled to reduce power consumption in certain situations. In an example, DVFS may be performed using Enhanced Intel SpeedStep™ technology available from Intel Corporation, Santa Clara, Calif., to provide optimal performance at a lowest power consumption level. In another example, DVFS may be performed using Intel TurboBoost™ technology to enable one or more cores or other compute engines to operate at a higher than guaranteed operating frequency based on conditions (e.g., workload and availability).

Another power management technique that may be used in certain examples is dynamic swapping of workloads between different compute engines. For example, the processor may include asymmetric cores or other processing engines that operate at different power consumption levels, such that in a power constrained situation, one or more workloads can be dynamically switched to execute on a lower power core or other compute engine. Another exemplary power management technique is hardware duty cycling (HDC), which may cause cores and/or other compute engines to be periodically enabled and disabled according to a duty cycle, such that one or more cores may be made inactive during an inactive period of the duty cycle and made active during an active period of the duty cycle. Although described with these particular examples, understand that many other power management techniques may be used in particular embodiments.

Figure 2:
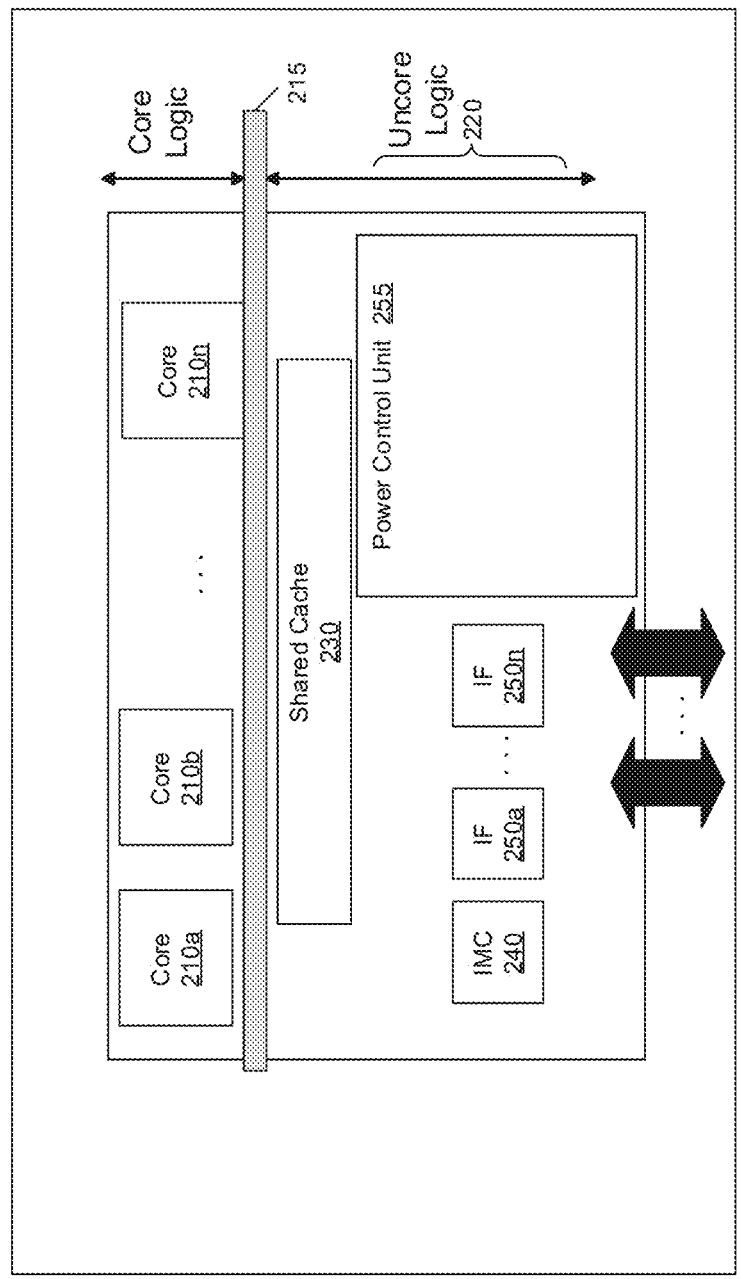
FIG. 2 is a block diagram of a processor in accordance with an embodiment of the present invention.

Embodiments can be implemented in processors for various markets including server processors, desktop processors, mobile processors and so forth. Referring now to FIG. 2, shown is a block diagram of a processor in accordance with an embodiment of the present invention. As shown in FIG. 2, processor 200 may be a multicore processor including a plurality of cores $210_a$-$210_n$. In one embodiment, each such core may be of an independent power domain and can be configured to enter and exit active states and/or maximum performance states based on workload. The various cores may be coupled via an interconnect 215 to a system agent or uncore 220 that includes various components. As seen, the uncore 220 may include a shared cache 230 which may be a last level cache. In addition, the uncore may include an integrated memory controller 240 to communicate with a system memory (not shown in FIG. 2), e.g., via a memory bus. Uncore 220 also includes various interfaces 250 and a power control unit 255, which may include logic to perform the power management techniques described herein.

In addition, by interfaces 250a-250n, connection can be made to various off-chip components such as peripheral devices, mass storage and so forth. While shown with this particular implementation in the embodiment of FIG. 2, the scope of the present invention is not limited in this regard.

Figure 3:
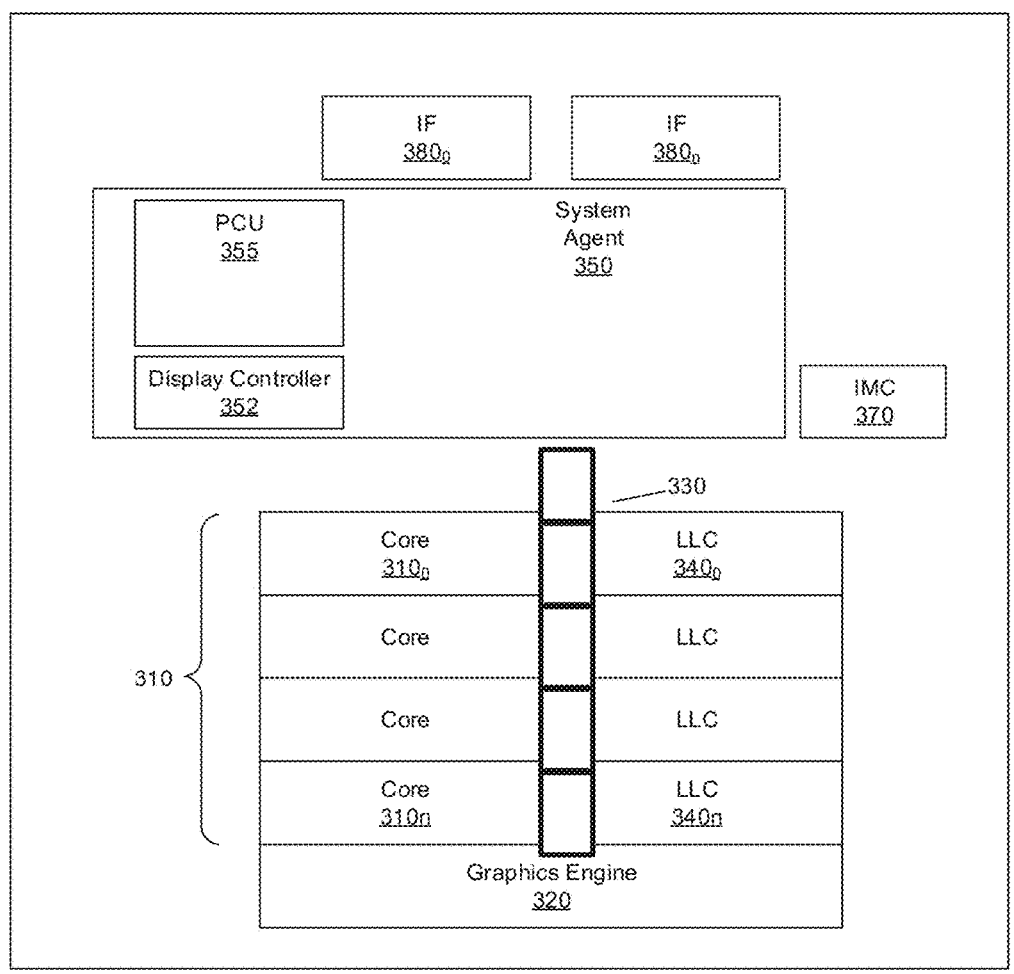
FIG. 3 is a block diagram of a multi-domain processor in accordance with another embodiment of the present invention.

Referring now to FIG. 3, shown is a block diagram of a multi-domain processor in accordance with another embodiment of the present invention. As shown in the embodiment of FIG. 3, processor 300 includes multiple domains. Specifically, a core domain 310 can include a plurality of cores $310_0$-$310_n$, a graphics domain 320 can include one or more graphics engines, and a system agent domain 350 may further be present. In some embodiments, system agent domain 350 may execute at an independent frequency than the core domain and may remain powered on at all times to handle power control events and power management such that domains 310 and 320 can be controlled to dynamically enter into and exit high power and low power states. Each of domains 310 and 320 may operate at different voltage and/or power. Note that while only shown with three domains, understand the scope of the present invention is not limited in this regard and additional domains can be present in other embodiments. For example, multiple core domains may be present each including at least one core.

In general, each core 310 may further include low level caches in addition to various execution units and additional processing elements. In turn, the various cores may be coupled to each other and to a shared cache memory formed of a plurality of units of a last level cache (LLC) $340_0$-$340_n$. In various embodiments, LLC 340 may be shared amongst the cores and the graphics engine, as well as various media processing circuitry. As seen, a ring interconnect 330 thus couples the cores together, and provides interconnection between the cores, graphics domain 320 and system agent circuitry 350. In one embodiment, interconnect 330 can be part of the core domain. However in other embodiments the ring interconnect can be of its own domain.

As further seen, system agent domain 350 may include display controller 352 which may provide control of and an interface to an associated display. As further seen, system agent domain 350 may include a power control unit 355 which can include logic to perform the power management techniques described herein.

As further seen in FIG. 3, processor 300 can further include an integrated memory controller (IMC) 370 that can provide for an interface to a system memory, such as a dynamic random access memory (DRAM). Multiple interfaces $380_0$-$380_n$ may be present to enable interconnection between the processor and other circuitry. For example, in one embodiment at least one direct media interface (DMI) interface may be provided as well as one or more PCIe™ interfaces. Still further, to provide for communications between other agents such as additional processors or other circuitry, one or more QPI interfaces may also be provided. Although shown at this high level in the embodiment of FIG. 3, understand the scope of the present invention is not limited in this regard.

Figure 4:
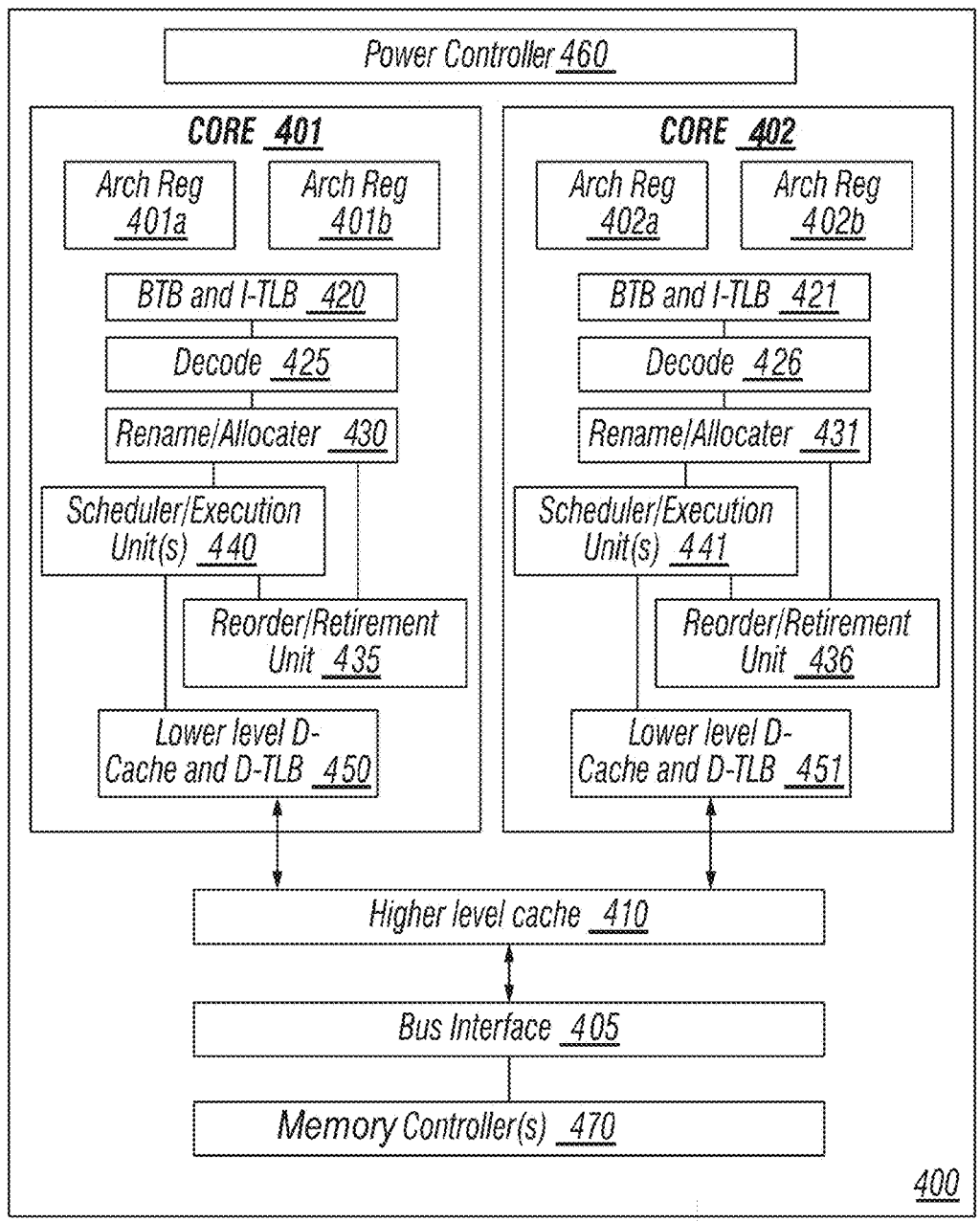
FIG. 4 is an embodiment of a processor including multiple cores.

Referring to FIG. 4, an embodiment of a processor including multiple cores is illustrated. Processor 400 includes any processor or processing device, such as a microprocessor, an embedded processor, a digital signal processor (DSP), a network processor, a handheld processor, an application processor, a co-processor, a system on a chip (SoC), or other device to execute code. Processor 400, in one embodiment, includes at least two cores—cores 401 and 402, which may include asymmetric cores or symmetric cores (the illustrated embodiment). However, processor 400 may include any number of processing elements that may be symmetric or asymmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor typically refers to an integrated circuit, which potentially includes any number of other processing elements, such as cores or hardware threads.

A core often refers to logic located on an integrated circuit capable of maintaining an independent architectural state, wherein each independently maintained architectural state is associated with at least some dedicated execution resources. In contrast to cores, a hardware thread typically refers to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 400, as illustrated in FIG. 4, includes two cores, cores 401 and 402. Here, cores 401 and 402 are considered symmetric cores, i.e., cores with the same configurations, functional units, and/or logic. In another embodiment, core 401 includes an out-of-order processor core, while core 402 includes an in-order processor core. However, cores 401 and 402 may be individually selected from any type of core, such as a native core, a software managed core, a core adapted to execute a native instruction set architecture (ISA), a core adapted to execute a translated ISA, a co-designed core, or other known core. Yet to further the discussion, the functional units illustrated in core 401 are described in further detail below, as the units in core 402 operate in a similar manner.

As depicted, core 401 includes two hardware threads 401a and 401b, which may also be referred to as hardware thread slots 401a and 401b. Therefore, software entities, such as an operating system, in one embodiment potentially view processor 400 as four separate processors, i.e., four logical processors or processing elements capable of executing four software threads concurrently. As alluded to above, a first thread is associated with architecture state registers 401a, a second thread is associated with architecture state registers 401b, a third thread may be associated with architecture state registers 402a, and a fourth thread may be associated with architecture state registers 402b. Here, each of the architecture state registers (401a, 401b, 402a, and 402b) may be referred to as processing elements, thread slots, or thread units, as described above. As illustrated, architecture state registers 401a are replicated in architecture state registers 401b, so individual architecture states/contexts are capable of being stored for logical processor 401a and logical processor 401b. In core 401, other smaller resources, such as instruction pointers and renaming logic in allocator and renamer block 430 may also be replicated for threads 401a and 401b. Some resources, such as re-order buffers in reorder/retirement unit 435, ILTB 420, load/store buffers, and queues may be shared through partitioning. Other resources, such as general purpose internal registers, page-table base register(s), low-level data-cache and data-TLB 415, execution unit(s) 440, and portions of out-of-order unit 435 are potentially fully shared.

Processor 400 often includes other resources, which may be fully shared, shared through partitioning, or dedicated by/to processing elements. In FIG. 4, an embodiment of a purely exemplary processor with illustrative logical units/resources of a processor is illustrated. Note that a processor may include, or omit, any of these functional units, as well as include any other known functional units, logic, or firmware not depicted. As illustrated, core 401 includes a simplified, representative out-of-order (OOO) processor core. But an in-order processor may be utilized in different embodiments. The OOO core includes a branch target buffer 420 to predict branches to be executed/taken and an instruction-translation buffer (I-TLB) 420 to store address translation entries for instructions.

Core 401 further includes decode module 425 coupled to fetch unit 420 to decode fetched elements. Fetch logic, in one embodiment, includes individual sequencers associated with thread slots 401a, 401b, respectively. Usually core 401 is associated with a first ISA, which defines/specifies instructions executable on processor 400. Often machine code instructions that are part of the first ISA include a portion of the instruction (referred to as an opcode), which references/specifies an instruction or operation to be performed. Decode logic 425 includes circuitry that recognizes these instructions from their opcodes and passes the decoded instructions on in the pipeline for processing as defined by the first ISA. For example, decoders 425, in one embodiment, include logic designed or adapted to recognize specific instructions, such as transactional instruction. As a result of the recognition by decoders 425, the architecture or core 401 takes specific, predefined actions to perform tasks associated with the appropriate instruction. It is important to note that any of the tasks, blocks, operations, and methods described herein may be performed in response to a single or multiple instructions; some of which may be new or old instructions.

In one example, allocator and renamer block 430 includes an allocator to reserve resources, such as register files to store instruction processing results. However, threads 401a and 401b are potentially capable of out-of-order execution, where allocator and renamer block 430 also reserves other resources, such as reorder buffers to track instruction results. Unit 430 may also include a register renamer to rename program/instruction reference registers to other registers internal to processor 400. Reorder/retirement unit 435 includes components, such as the reorder buffers mentioned above, load buffers, and store buffers, to support out-of-order execution and later in-order retirement of instructions executed out-of-order.

Scheduler and execution unit(s) block 440, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 450 are coupled to execution unit(s) 440. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages.

Here, cores 401 and 402 share access to higher-level or further-out cache 410, which is to cache recently fetched elements. Note that higher-level or further-out refers to cache levels increasing or getting further away from the execution unit(s). In one embodiment, higher-level cache 410 is a last-level data cache—last cache in the memory hierarchy on processor 400—such as a second or third level data cache. However, higher level cache 410 is not so limited, as it may be associated with or includes an instruction cache. A trace cache—a type of instruction cache—instead may be coupled after decoder 425 to store recently decoded traces.

In the depicted configuration, processor 400 also includes bus interface module 405 and a power controller 460, which may perform power management in accordance with an embodiment of the present invention. In this scenario, bus interface 405 is to communicate with devices external to processor 400, such as system memory and other components.

A memory controller 470 may interface with other devices such as one or many memories. In an example, bus interface 405 includes a ring interconnect with a memory controller for interfacing with a memory and a graphics controller for interfacing with a graphics processor. In an SoC environment, even more devices, such as a network interface, coprocessors, memory, graphics processor, and any other known computer devices/interface may be integrated on a single die or integrated circuit to provide small form factor with high functionality and low power consumption.

Figure 5:
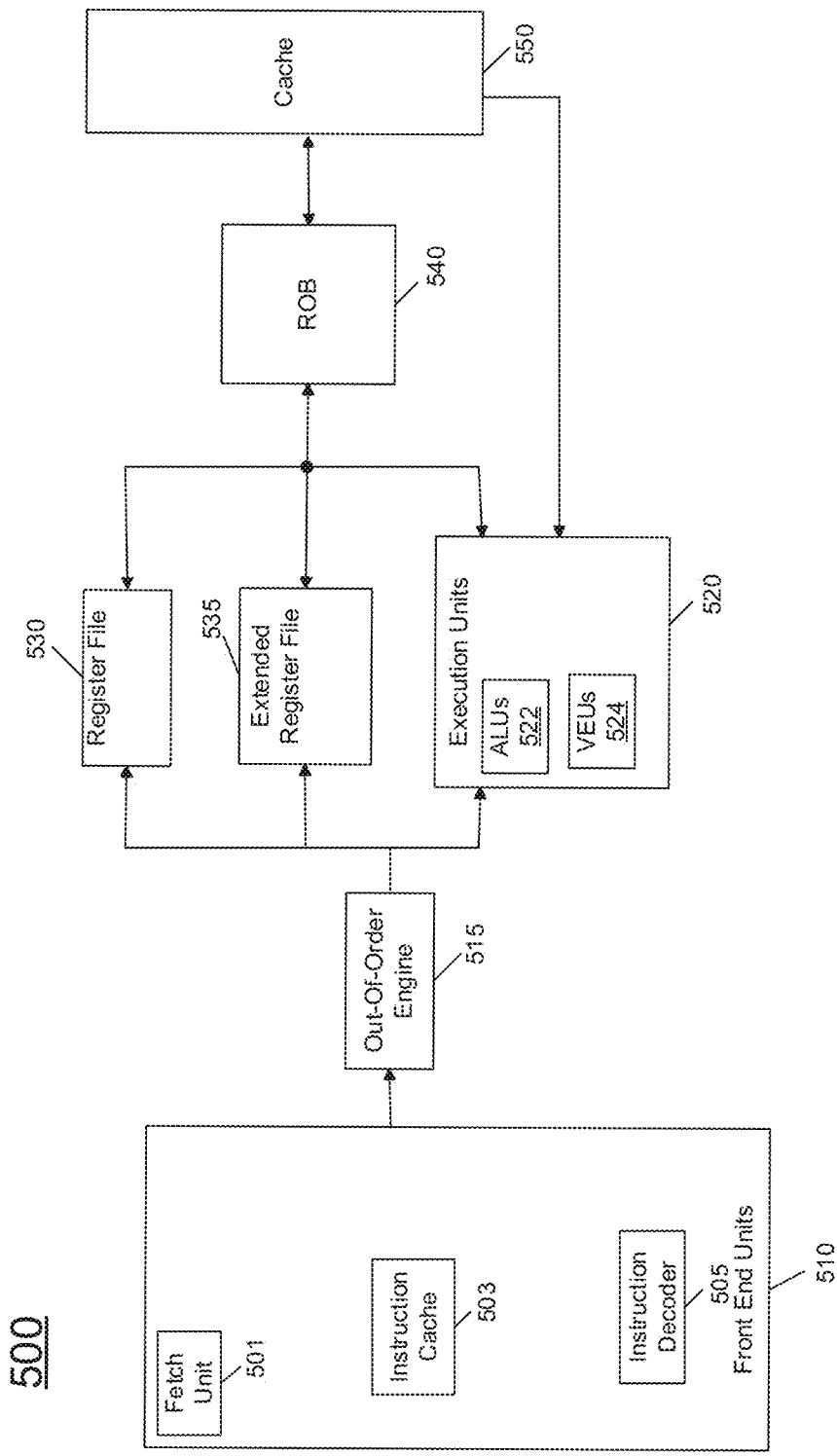
FIG. 5 is a block diagram of a micro-architecture of a processor core in accordance with one embodiment of the present invention.

Referring now to FIG. 5, shown is a block diagram of a micro-architecture of a processor core in accordance with one embodiment of the present invention. As shown in FIG. 5, processor core 500 may be a multi-stage pipelined out-of-order processor. Core 500 may operate at various voltages based on a received operating voltage, which may be received from an integrated voltage regulator or external voltage regulator.

As seen in FIG. 5, core 500 includes front end units 510, which may be used to fetch instructions to be executed and prepare them for use later in the processor pipeline. For example, front end units 510 may include a fetch unit 501, an instruction cache 503, and an instruction decoder 505. In some implementations, front end units 510 may further include a trace cache, along with microcode storage as well as a micro-operation storage. Fetch unit 501 may fetch macro-instructions, e.g., from memory or instruction cache 503, and feed them to instruction decoder 505 to decode them into primitives, i.e., micro-operations for execution by the processor.

Coupled between front end units 510 and execution units 520 is an out-of-order (OOO) engine 515 that may be used to receive the micro-instructions and prepare them for execution. More specifically OOO engine 515 may include various buffers to re-order micro-instruction flow and allocate various resources needed for execution, as well as to provide renaming of logical registers onto storage locations within various register files such as register file 530 and extended register file 535. Register file 530 may include separate register files for integer and floating point operations. For purposes of configuration, control, and additional operations, a set of machine specific registers (MSRs) 538 may also be present and accessible to various logic within core 500 (and external to the core). For example, power limit information may be stored in one or more MSR and be dynamically updated as described herein.

Various resources may be present in execution units 520, including, for example, various integer, floating point, and single instruction multiple data (SIMD) logic units, among other specialized hardware. For example, such execution units may include one or more arithmetic logic units (ALUs) 522 and one or more vector execution units 524, among other such execution units.

Results from the execution units may be provided to retirement logic, namely a reorder buffer (ROB) 540. More specifically, ROB 540 may include various arrays and logic to receive information associated with instructions that are executed. This information is then examined by ROB 540 to determine whether the instructions can be validly retired and result data committed to the architectural state of the processor, or whether one or more exceptions occurred that prevent a proper retirement of the instructions. Of course, ROB 540 may handle other operations associated with retirement.

As shown in FIG. 5, ROB 540 is coupled to a cache 550 which, in one embodiment may be a low level cache (e.g., an L1 cache) although the scope of the present invention is not limited in this regard. Also, execution units 520 can be directly coupled to cache 550. From cache 550, data communication may occur with higher level caches, system memory and so forth. While shown with this high level in the embodiment of FIG. 5, understand the scope of the present invention is not limited in this regard. For example, while the implementation of FIG. 5 is with regard to an out-of-order machine such as of an Intel® x86 instruction set architecture (ISA), the scope of the present invention is not limited in this regard. That is, other embodiments may be implemented in an in-order processor, a reduced instruction set computing (RISC) processor such as an ARM-based processor, or a processor of another type of ISA that can emulate instructions and operations of a different ISA via an emulation engine and associated logic circuitry.

Figure 6:
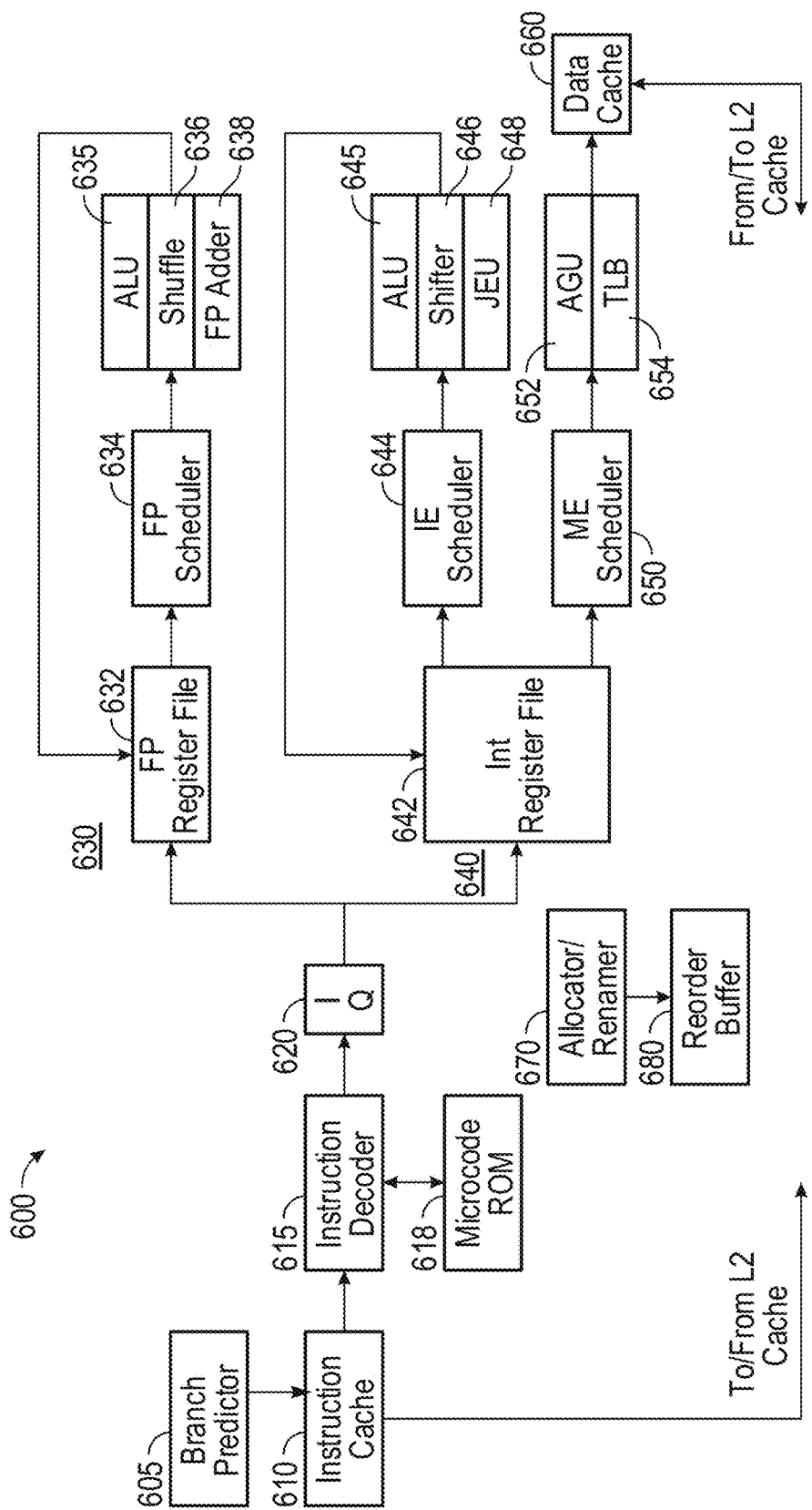
FIG. 6 is a block diagram of a micro-architecture of a processor core in accordance with another embodiment.

Referring now to FIG. 6, shown is a block diagram of a micro-architecture of a processor core in accordance with another embodiment. In the embodiment of FIG. 6, core 600 may be a low power core of a different micro-architecture, such as an Intel® Atom™-based processor having a relatively limited pipeline depth designed to reduce power consumption. As seen, core 600 includes an instruction cache 610 coupled to provide instructions to an instruction decoder 615. A branch predictor 605 may be coupled to instruction cache 610. Note that instruction cache 610 may further be coupled to another level of a cache memory, such as an L2 cache (not shown for ease of illustration in FIG. 6). In turn, instruction decoder 615 provides decoded instructions to an issue queue 620 for storage and delivery to a given execution pipeline. A microcode ROM 618 is coupled to instruction decoder 615.

A floating point pipeline 630 includes a floating point register file 632 which may include a plurality of architectural registers of a given bit with such as 128, 256 or 512 bits. Pipeline 630 includes a floating point scheduler 634 to schedule instructions for execution on one of multiple execution units of the pipeline. In the embodiment shown, such execution units include an ALU 635, a shuffle unit 636, and a floating point adder 638. In turn, results generated in these execution units may be provided back to buffers and/or registers of register file 632. Of course understand while shown with these few example execution units, additional or different floating point execution units may be present in another embodiment.

An integer pipeline 640 also may be provided. In the embodiment shown, pipeline 640 includes an integer register file 642 which may include a plurality of architectural registers of a given bit with such as 128 or 256 bits. Pipeline 640 includes an integer scheduler 644 to schedule instructions for execution on one of multiple execution units of the pipeline. In the embodiment shown, such execution units include an ALU 645, a shifter unit 646, and a jump execution unit 648. In turn, results generated in these execution units may be provided back to buffers and/or registers of register file 642. Of course understand while shown with these few example execution units, additional or different integer execution units may be present in another embodiment.

A memory execution scheduler 650 may schedule memory operations for execution in an address generation unit 652, which is also coupled to a TLB 654. As seen, these structures may couple to a data cache 660, which may be a L0 and/or L1 data cache that in turn couples to additional levels of a cache memory hierarchy, including an L2 cache memory.

To provide support for out-of-order execution, an allocator/renamer 670 may be provided, in addition to a reorder buffer 680, which is configured to reorder instructions executed out of order for retirement in order. Although shown with this particular pipeline architecture in the illustration of FIG. 6, understand that many variations and alternatives are possible.

Note that in a processor having asymmetric cores, such as in accordance with the micro-architectures of FIGS. 5 and 6, workloads may be dynamically swapped between the cores for power management reasons, as these cores, although having different pipeline designs and depths, may be of the same or related ISA. Such dynamic core swapping may be performed in a manner transparent to a user application (and possibly kernel also).

Figure 7:
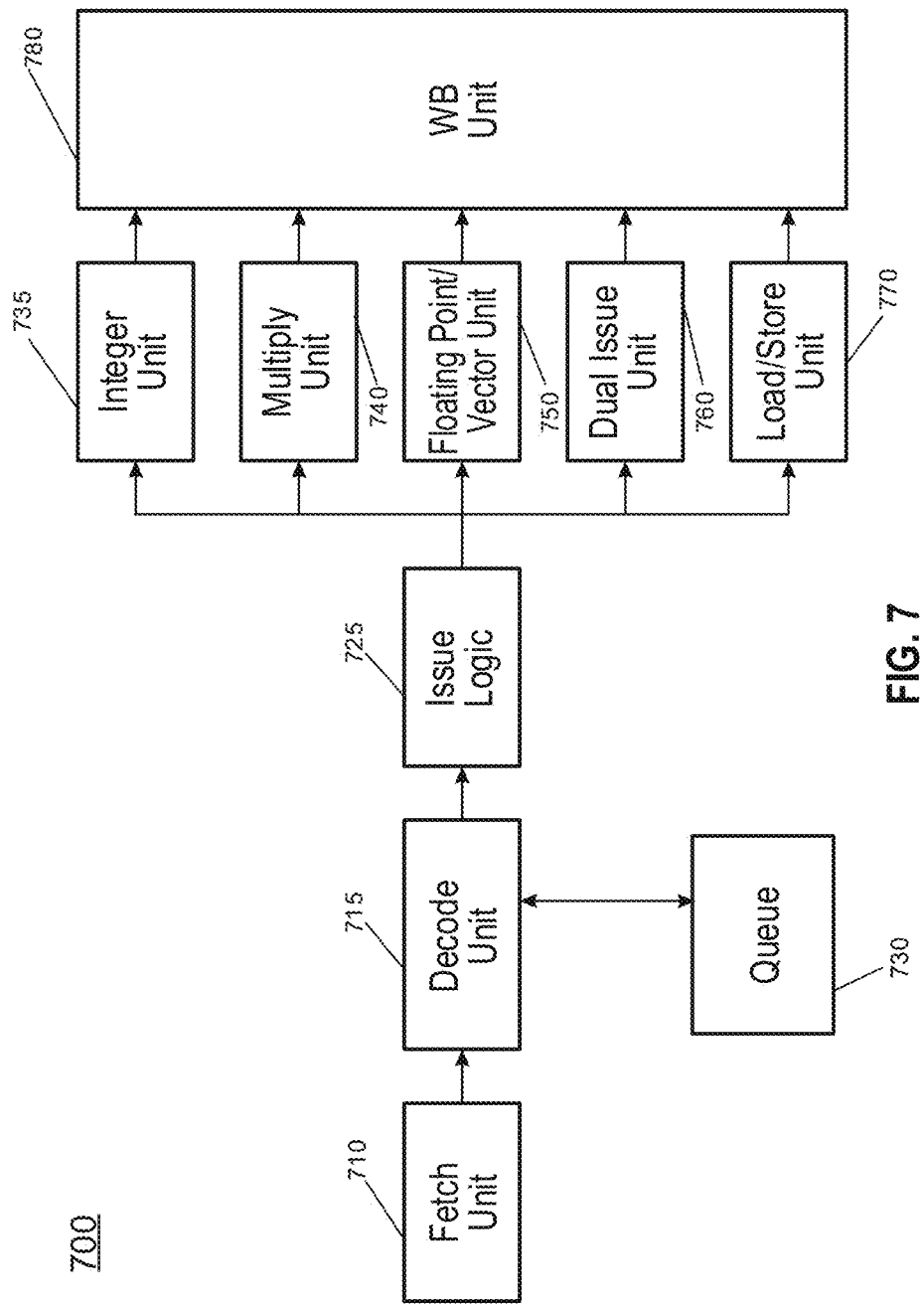
FIG. 7 is a block diagram of a micro-architecture of a processor core in accordance with yet another embodiment.

Referring to FIG. 7, shown is a block diagram of a micro-architecture of a processor core in accordance with yet another embodiment. As illustrated in FIG. 7, a core 700 may include a multi-staged in-order pipeline to execute at very low power consumption levels. As one such example, processor 700 may have a micro-architecture in accordance with an ARM Cortex A53 design available from ARM Holdings, LTD., Sunnyvale, Calif. In an implementation, an 8-stage pipeline may be provided that is configured to execute both 32-bit and 64-bit code. Core 700 includes a fetch unit 710 that is configured to fetch instructions and provide them to a decode unit 715, which may decode the instructions, e.g., macro-instructions of a given ISA such as an ARMv8 ISA. Note further that a queue 730 may couple to decode unit 715 to store decoded instructions. Decoded instructions are provided to an issue logic 725, where the decoded instructions may be issued to a given one of multiple execution units.

With further reference to FIG. 7, issue logic 725 may issue instructions to one of multiple execution units. In the embodiment shown, these execution units include an integer unit 735, a multiply unit 740, a floating point/vector unit 750, a dual issue unit 760, and a load/store unit 770. The results of these different execution units may be provided to a writeback unit 780. Understand that while a single writeback unit is shown for ease of illustration, in some implementations separate writeback units may be associated with each of the execution units. Furthermore, understand that while each of the units and logic shown in FIG. 7 is represented at a high level, a particular implementation may include more or different structures. A processor designed using one or more cores having a pipeline as in FIG. 7 may be implemented in many different end products, extending from mobile devices to server systems.

Figure 8:
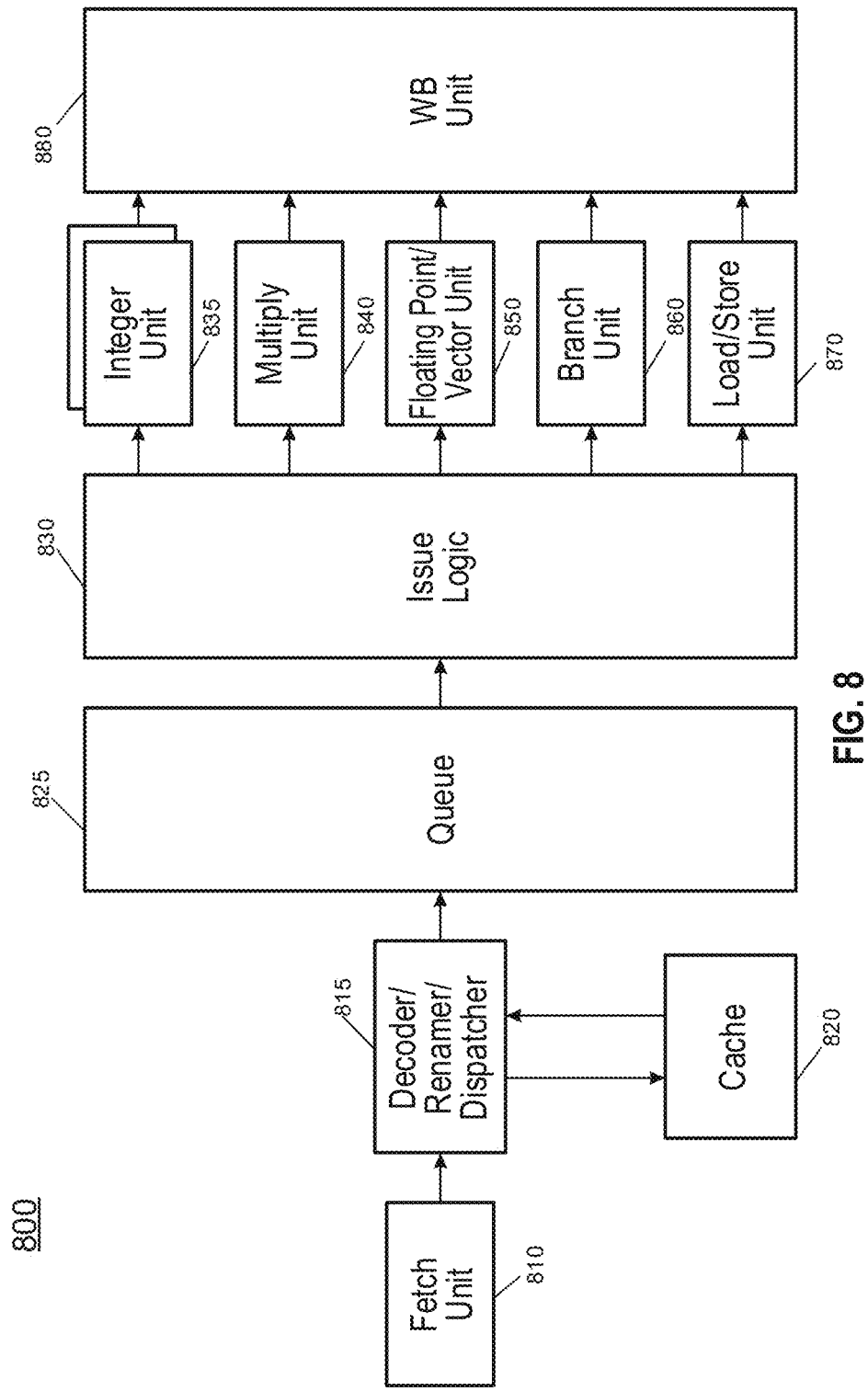
FIG. 8 is a block diagram of a micro-architecture of a processor core in accordance with a still further embodiment.

Referring to FIG. 8, shown is a block diagram of a micro-architecture of a processor core in accordance with a still further embodiment. As illustrated in FIG. 8, a core 800 may include a multi-stage multi-issue out-of-order pipeline to execute at very high performance levels (which may occur at higher power consumption levels than core 700 of FIG. 7). As one such example, processor 800 may have a microarchitecture in accordance with an ARM Cortex A57 design. In an implementation, a 15 (or greater)-stage pipeline may be provided that is configured to execute both 32-bit and 64-bit code. In addition, the pipeline may provide for 3 (or greater)-wide and 3 (or greater)-issue operation. Core 800 includes a fetch unit 810 that is configured to fetch instructions and provide them to a decoder/renamer/dispatcher 815, which may decode the instructions, e.g., macro-instructions of an ARMv8 instruction set architecture, rename register references within the instructions, and dispatch the instructions (eventually) to a selected execution unit. Decoded instructions may be stored in a queue 825. Note that while a single queue structure is shown for ease of illustration in FIG. 8, understand that separate queues may be provided for each of the multiple different types of execution units.

Also shown in FIG. 8 is an issue logic 830 from which decoded instructions stored in queue 825 may be issued to a selected execution unit. Issue logic 830 also may be implemented in a particular embodiment with a separate issue logic for each of the multiple different types of execution units to which issue logic 830 couples.

Decoded instructions may be issued to a given one of multiple execution units. In the embodiment shown, these execution units include one or more integer units 835, a multiply unit 840, a floating point/vector unit 850, a branch unit 860, and a load/store unit 870. In an embodiment, floating point/vector unit 850 may be configured to handle SIMD or vector data of 128 or 256 bits. Still further, floating point/vector execution unit 850 may perform IEEE-754 double precision floating-point operations. The results of these different execution units may be provided to a writeback unit 880. Note that in some implementations separate writeback units may be associated with each of the execution units. Furthermore, understand that while each of the units and logic shown in FIG. 8 is represented at a high level, a particular implementation may include more or different structures.

Note that in a processor having asymmetric cores, such as in accordance with the micro-architectures of FIGS. 7 and 8, workloads may be dynamically swapped for power management reasons, as these cores, although having different pipeline designs and depths, may be of the same or related ISA. Such dynamic core swapping may be performed in a manner transparent to a user application (and possibly kernel also).

Figure 9:
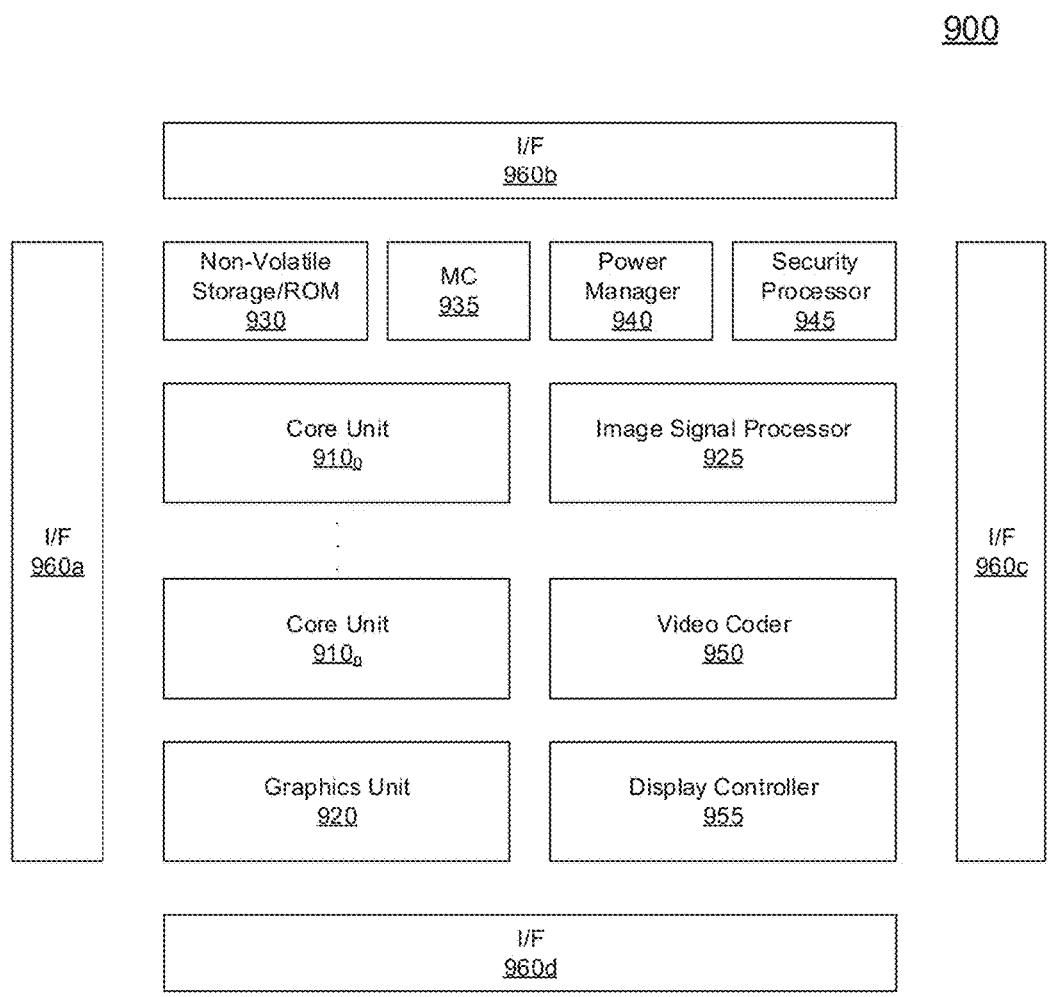
FIG. 9 is a block diagram of a processor in accordance with another embodiment of the present invention.

A processor designed using one or more cores having pipelines as in any one or more of FIGS. 5-8 may be implemented in many different end products, extending from mobile devices to server systems. Referring now to FIG. 9, shown is a block diagram of a processor in accordance with another embodiment of the present invention. In the embodiment of FIG. 9, processor 900 may be a SoC including multiple domains, each of which may be controlled to operate at an independent operating voltage and operating frequency. As a specific illustrative example, processor 900 may be an Intel® Architecture Core™-based processor such as an i3, i5, i7 or another such processor available from Intel Corporation. However, other low power processors such as available from Advanced Micro Devices, Inc. (AMD) of Sunnyvale, Calif., an ARM-based design from ARM Holdings, Ltd. or licensee thereof or a MIPS-based design from MIPS Technologies, Inc. of Sunnyvale, Calif., or their licensees or adopters may instead be present in other embodiments such as an Apple A7 processor, a Qualcomm Snapdragon processor, or Texas Instruments OMAP processor. Such SoC may be used in a low power system such as a smartphone, tablet computer, phablet computer, Ultrabook™ computer or other portable computing device.

In the high level view shown in FIG. 9, processor 900 includes a plurality of core units $910_0$-$910_n$. Each core unit may include one or more processor cores, one or more cache memories and other circuitry. Each core unit 910 may support one or more instructions sets (e.g., an x86 instruction set (with some extensions that have been added with newer versions); a MIPS instruction set; an ARM instruction set (with optional additional extensions such as NEON)) or other instruction set or combinations thereof. Note that some of the core units may be heterogeneous resources (e.g., of a different design). In addition, each such core may be coupled to a cache memory (not shown) which in an embodiment may be a shared level (L2) cache memory. A non-volatile storage 930 may be used to store various program and other data. For example, this storage may be used to store at least portions of microcode, boot information such as a BIOS, other system software or so forth.

Each core unit 910 may also include an interface such as a bus interface unit to enable interconnection to additional circuitry of the processor. In an embodiment, each core unit 910 couples to a coherent fabric that may act as a primary cache coherent on-die interconnect that in turn couples to a memory controller 935. In turn, memory controller 935 controls communications with a memory such as a DRAM (not shown for ease of illustration in FIG. 9).

In addition to core units, additional processing engines are present within the processor, including at least one graphics unit 920 which may include one or more graphics processing units (GPUs) to perform graphics processing as well as to possibly execute general purpose operations on the graphics processor (so-called GPGPU operation). In addition, at least one image signal processor 925 may be present. Signal processor 925 may be configured to process incoming image data received from one or more capture devices, either internal to the SoC or off-chip.

Other accelerators also may be present. In the illustration of FIG. 9, a video coder 950 may perform coding operations including encoding and decoding for video information, e.g., providing hardware acceleration support for high definition video content. A display controller 955 further may be provided to accelerate display operations including providing support for internal and external displays of a system. In addition, a security processor 945 may be present to perform security operations such as secure boot operations, various cryptography operations and so forth.

Each of the units may have its power consumption controlled via a power manager 940, which may include control logic to perform the various power management techniques described herein.

In some embodiments, SoC 900 may further include a non-coherent fabric coupled to the coherent fabric to which various peripheral devices may couple. One or more interfaces 960$a$-960$d$ enable communication with one or more off-chip devices. Such communications may be via a variety of communication protocols such as PCIe™, GPIO, USB, I²C, UART, MIPI, SDIO, DDR, SPI, HDMI, among other types of communication protocols. Although shown at this high level in the embodiment of FIG. 9, understand the scope of the present invention is not limited in this regard.

Figure 10:
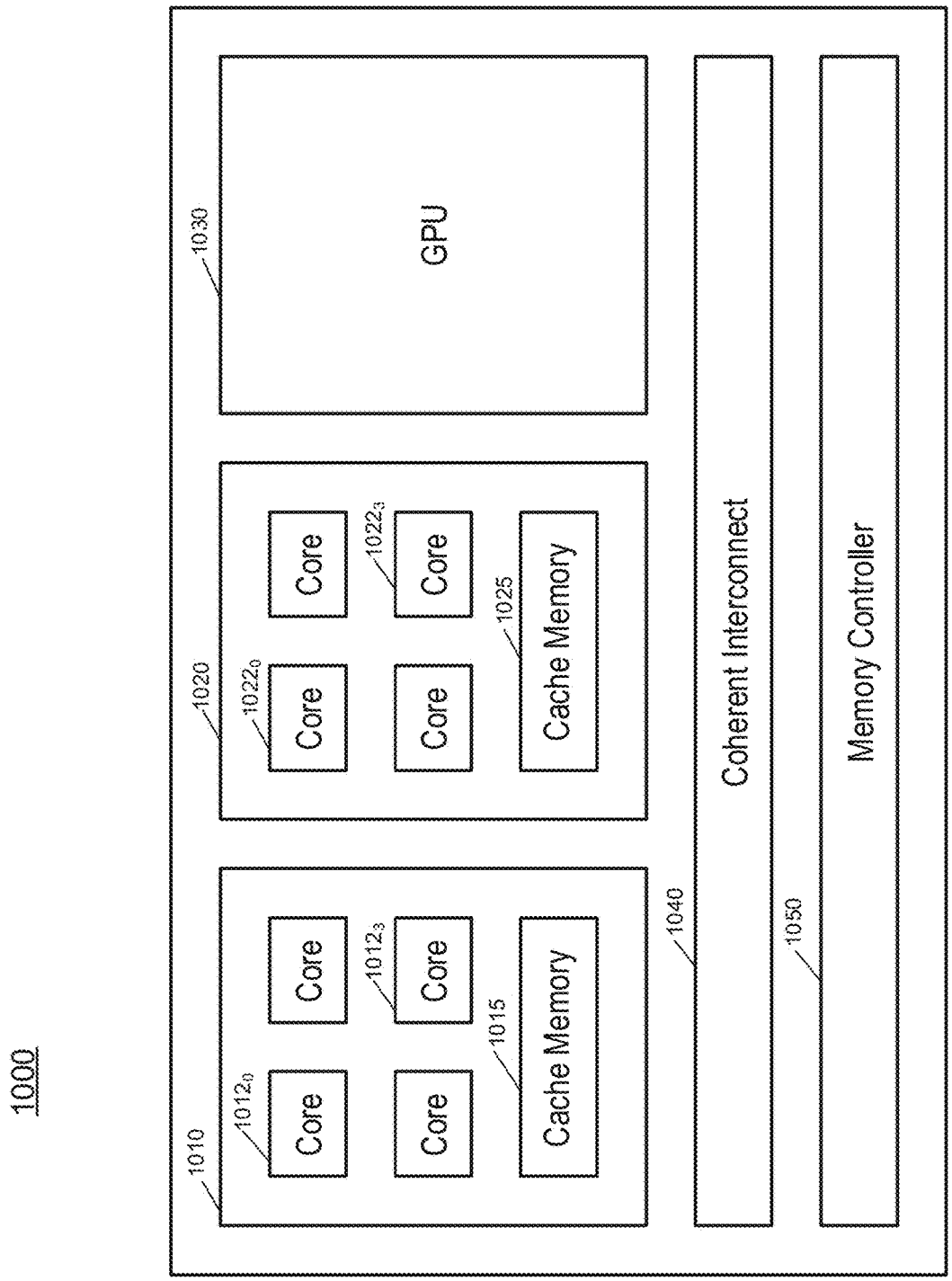
FIG. 10 is a block diagram of a representative SoC in accordance with an embodiment of the present invention.

Referring now to FIG. 10, shown is a block diagram of a representative SoC. In the embodiment shown, SoC 1000 may be a multi-core SoC configured for low power operation to be optimized for incorporation into a smartphone or other low power device such as a tablet computer or other portable computing device. As an example, SoC 1000 may be implemented using asymmetric or different types of cores, such as combinations of higher power and/or low power cores, e.g., out-of-order cores and in-order cores. In different embodiments, these cores may be based on an Intel® Architecture™ core design or an ARM architecture design. In yet other embodiments, a mix of Intel and ARM cores may be implemented in a given SoC.

As seen in FIG. 10, SoC 1000 includes a first core domain 1010 having a plurality of first cores $1012_0$-$1012_3$. In an example, these cores may be low power cores such as in-order cores. In one embodiment these first cores may be implemented as ARM Cortex A53 cores. In turn, these cores couple to a cache memory 1015 of core domain 1010. In addition, SoC 1000 includes a second core domain 1020. In the illustration of FIG. 10, second core domain 1020 has a plurality of second cores $1022_0$-$1022_3$. In an example, these cores may be higher power-consuming cores than first cores 1012. In an embodiment, the second cores may be out-of-order cores, which may be implemented as ARM Cortex A57 cores. In turn, these cores couple to a cache memory 1025 of core domain 1020. Note that while the example shown in FIG. 10 includes 4 cores in each domain, understand that more or fewer cores may be present in a given domain in other examples.

With further reference to FIG. 10, a graphics domain 1030 also is provided, which may include one or more graphics processing units (GPUs) configured to independently execute graphics workloads, e.g., provided by one or more cores of core domains 1010 and 1020. As an example, GPU domain 1030 may be used to provide display support for a variety of screen sizes, in addition to providing graphics and display rendering operations.

As seen, the various domains couple to a coherent interconnect 1040, which in an embodiment may be a cache coherent interconnect fabric that in turn couples to an integrated memory controller 1050. Coherent interconnect 1040 may include a shared cache memory, such as an L3 cache, in some examples. In an embodiment, memory controller 1050 may be a direct memory controller to provide for multiple channels of communication with an off-chip memory, such as multiple channels of a DRAM (not shown for ease of illustration in FIG. 10).

In different examples, the number of the core domains may vary. For example, for a low power SoC suitable for incorporation into a mobile computing device, a limited number of core domains such as shown in FIG. 10 may be present. Still further, in such low power SoCs, core domain 1020 including higher power cores may have fewer numbers of such cores. For example, in one implementation two cores 1022 may be provided to enable operation at reduced power consumption levels. In addition, the different core domains may also be coupled to an interrupt controller to enable dynamic swapping of workloads between the different domains.

In yet other embodiments, a greater number of core domains, as well as additional optional IP logic may be present, in that an SoC can be scaled to higher performance (and power) levels for incorporation into other computing devices, such as desktops, servers, high performance computing systems, base stations forth. As one such example, 4 core domains each having a given number of out-of-order cores may be provided. Still further, in addition to optional GPU support (which as an example may take the form of a GPGPU), one or more accelerators to provide optimized hardware support for particular functions (e.g. web serving, network processing, switching or so forth) also may be provided. In addition, an input/output interface may be present to couple such accelerators to off-chip components.

Figure 11:
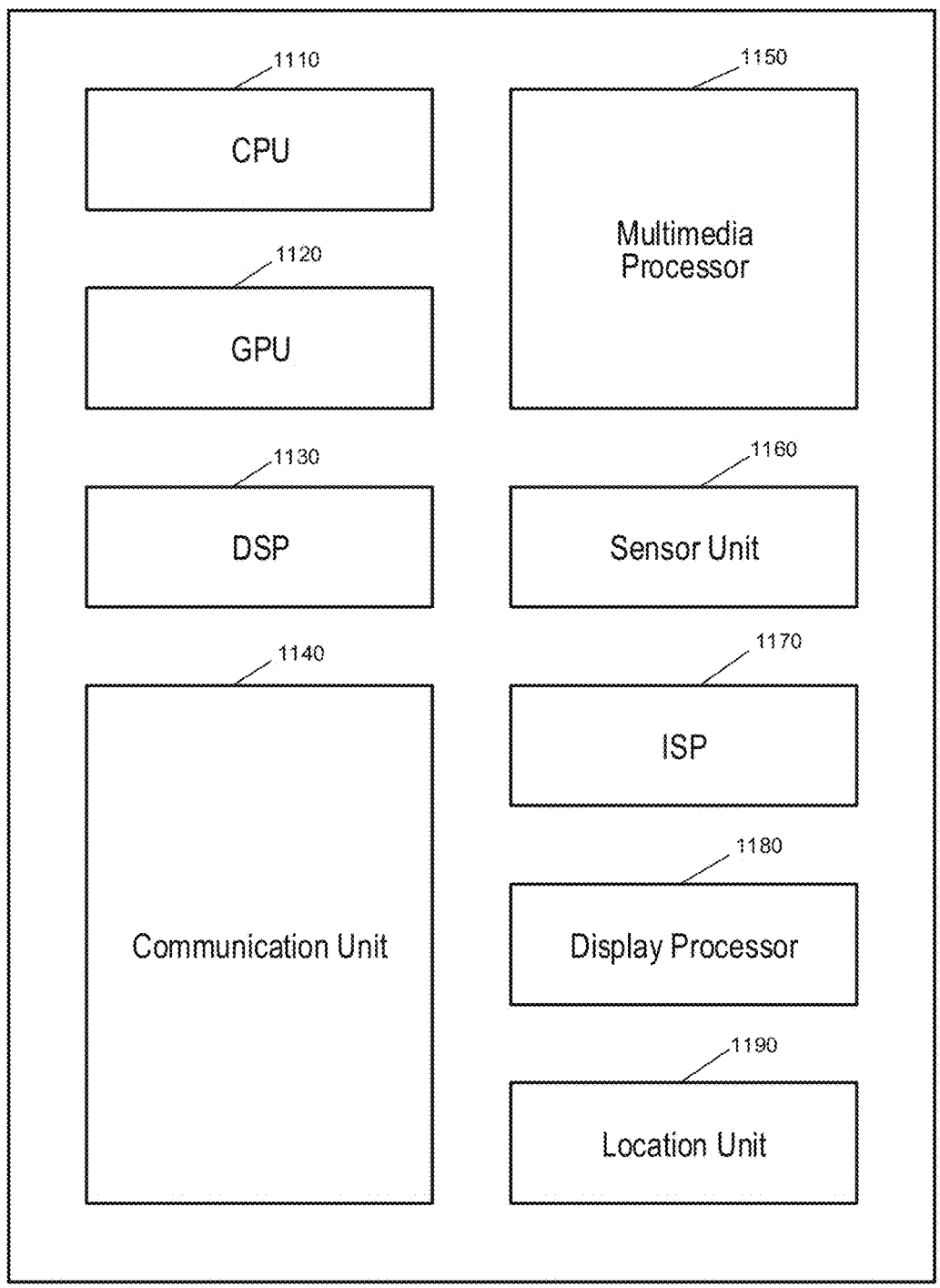
FIG. 11 is a block diagram of another example SoC in accordance with an embodiment of the present invention.

Referring now to FIG. 11, shown is a block diagram of another example SoC. In the embodiment of FIG. 11, SoC 1100 may include various circuitry to enable high performance for multimedia applications, communications and other functions. As such, SoC 1100 is suitable for incorporation into a wide variety of portable and other devices, such as smartphones, tablet computers, smart TVs and so forth. In the example shown, SoC 1100 includes a central processor unit (CPU) domain 1110. In an embodiment, a plurality of individual processor cores may be present in CPU domain 1110. As one example, CPU domain 1110 may be a quad core processor having 4 multithreaded cores. Such processors may be homogeneous or heterogeneous processors, e.g., a mix of low power and high power processor cores.

In turn, a GPU domain 1120 is provided to perform advanced graphics processing in one or more GPUs to handle graphics and compute APIs. A DSP unit 1130 may provide one or more low power DSPs for handling low-power multimedia applications such as music playback, audio/video and so forth, in addition to advanced calculations that may occur during execution of multimedia instructions. In turn, a communication unit 1140 may include various components to provide connectivity via various wireless protocols, such as cellular communications (including 3G/4G LTE), wireless local area protocols such as Bluetooth™, IEEE 802.11, and so forth.

Still further, a multimedia processor 1150 may be used to perform capture and playback of high definition video and audio content, including processing of user gestures. A sensor unit 1160 may include a plurality of sensors and/or a sensor controller to interface to various off-chip sensors present in a given platform. An image signal processor 1170 may be provided with one or more separate ISPs to perform image processing with regard to captured content from one or more cameras of a platform, including still and video cameras.

A display processor 1180 may provide support for connection to a high definition display of a given pixel density, including the ability to wirelessly communicate content for playback on such display. Still further, a location unit 1190 may include a GPS receiver with support for multiple GPS constellations to provide applications highly accurate positioning information obtained using as such GPS receiver. Understand that while shown with this particular set of components in the example of FIG. 11, many variations and alternatives are possible.

Figure 12:
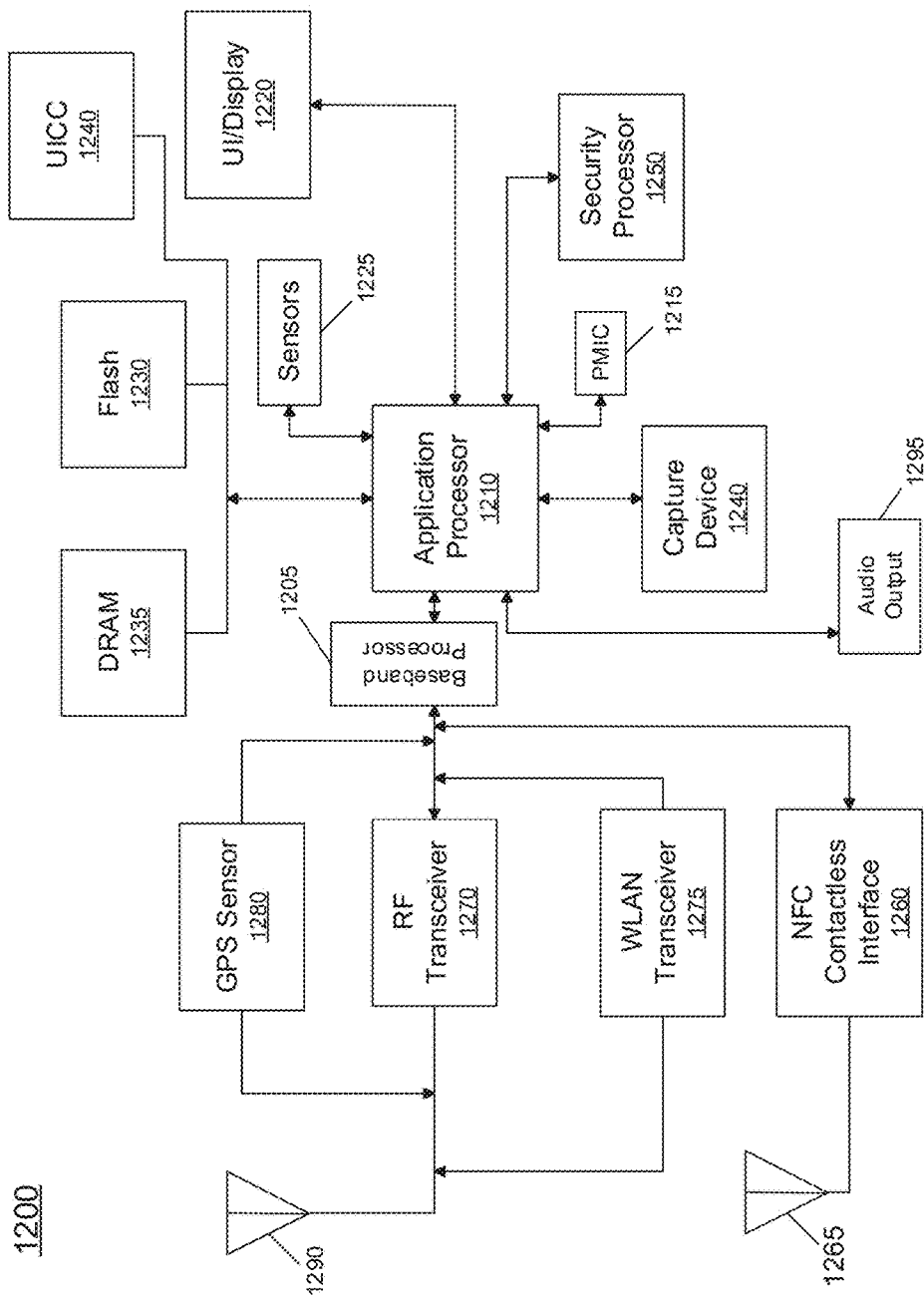
FIG. 12 is a block diagram of an example system with which embodiments can be used.

Referring now to FIG. 12, shown is a block diagram of an example system with which embodiments can be used. As seen, system 1200 may be a smartphone or other wireless communicator. A baseband processor 1205 is configured to perform various signal processing with regard to communication signals to be transmitted from or received by the system. In turn, baseband processor 1205 is coupled to an application processor 1210, which may be a main CPU of the system to execute an OS and other system software, in addition to user applications such as many well-known social media and multimedia apps. Application processor 1210 may further be configured to perform a variety of other computing operations for the device.

In turn, application processor 1210 can couple to a user interface/display 1220, e.g., a touch screen display. In addition, application processor 1210 may couple to a memory system including a non-volatile memory, namely a flash memory 1230 and a system memory, namely a dynamic random access memory (DRAM) 1235. As further seen, application processor 1210 further couples to a capture device 1240 such as one or more image capture devices that can record video and/or still images.

Still referring to FIG. 12, a universal integrated circuit card (UICC) 1240 comprising a subscriber identity module and possibly a secure storage and cryptoprocessor is also coupled to application processor 1210. System 1200 may further include a security processor 1250 that may couple to application processor 1210. A plurality of sensors 1225 may couple to application processor 1210 to enable input of a variety of sensed information such as accelerometer and other environmental information. An audio output device 1295 may provide an interface to output sound, e.g., in the form of voice communications, played or streaming audio data and so forth.

As further illustrated, a near field communication (NFC) contactless interface 1260 is provided that communicates in a NFC near field via an NFC antenna 1265. While separate antennae are shown in FIG. 12, understand that in some implementations one antenna or a different set of antennae may be provided to enable various wireless functionality.

A power management integrated circuit (PMIC) 1215 couples to application processor 1210 to perform platform level power management. To this end, PMIC 1215 may issue power management requests to application processor 1210 to enter certain low power states as desired. Furthermore, based on platform constraints, PMIC 1215 may also control the power level of other components of system 1200.

To enable communications to be transmitted and received, various circuitry may be coupled between baseband processor 1205 and an antenna 1290. Specifically, a radio frequency (RF) transceiver 1270 and a wireless local area network (WLAN) transceiver 1275 may be present. In general, RF transceiver 1270 may be used to receive and transmit wireless data and calls according to a given wireless communication protocol such as 3G or 4G wireless communication protocol such as in accordance with a code division multiple access (CDMA), global system for mobile communication (GSM), long term evolution (LTE) or other protocol. In addition a GPS sensor 1280 may be present. Other wireless communications such as receipt or transmission of radio signals, e.g., AM/FM and other signals may also be provided. In addition, via WLAN transceiver 1275, local wireless communications can also be realized.

Figure 13:
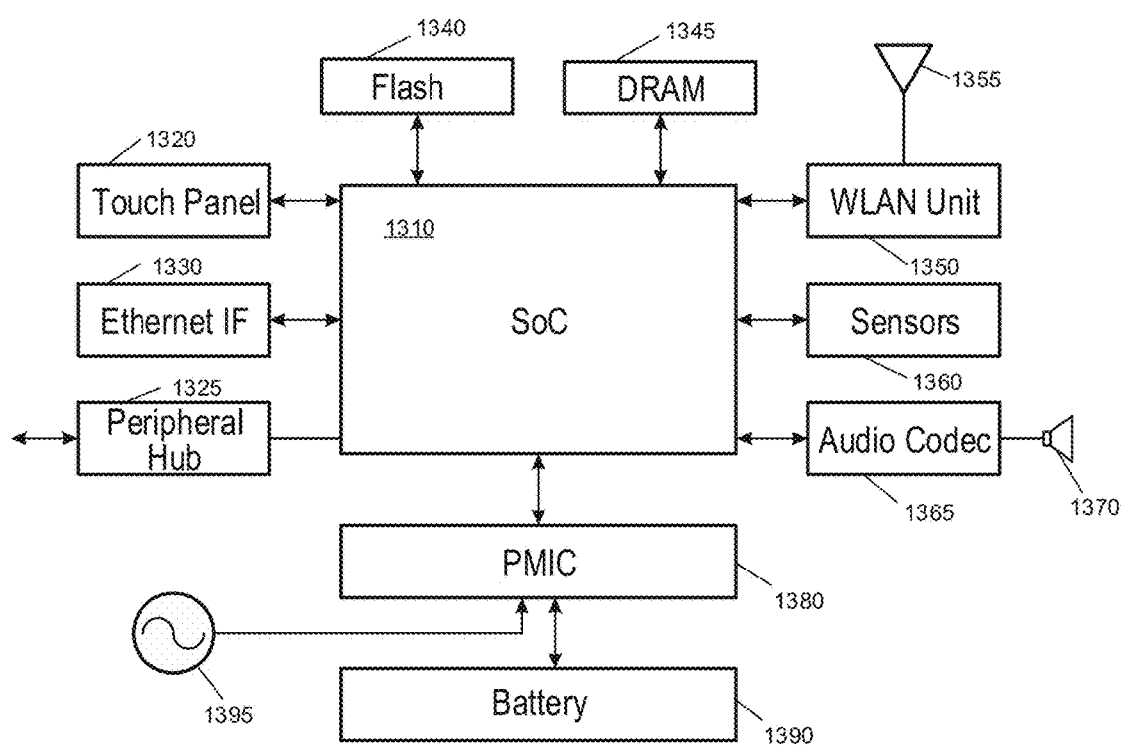
FIG. 13 is a block diagram of another example system with which embodiments may be used.

Referring now to FIG. 13, shown is a block diagram of another example system with which embodiments may be used. In the illustration of FIG. 13, system 1300 may be mobile low-power system such as a tablet computer, 2:1 tablet, phablet or other convertible or standalone tablet system. As illustrated, a SoC 1310 is present and may be configured to operate as an application processor for the device.

A variety of devices may couple to SoC 1310. In the illustration shown, a memory subsystem includes a flash memory 1340 and a DRAM 1345 coupled to SoC 1310. In addition, a touch panel 1320 is coupled to the SoC 1310 to provide display capability and user input via touch, including provision of a virtual keyboard on a display of touch panel 1320. To provide wired network connectivity, SoC 1310 couples to an Ethernet interface 1330. A peripheral hub 1325 is coupled to SoC 1310 to enable interfacing with various peripheral devices, such as may be coupled to system 1300 by any of various ports or other connectors.

In addition to internal power management circuitry and functionality within SoC 1310, a PMIC 1380 is coupled to SoC 1310 to provide platform-based power management, e.g., based on whether the system is powered by a battery 1390 or AC power via an AC adapter 1395. In addition to this power source-based power management, PMIC 1380 may further perform platform power management activities based on environmental and usage conditions. Still further, PMIC 1380 may communicate control and status information to SoC 1310 to cause various power management actions within SoC 1310.

Still referring to FIG. 13, to provide for wireless capabilities, a WLAN unit 1350 is coupled to SoC 1310 and in turn to an antenna 1355. In various implementations, WLAN unit 1350 may provide for communication according to one or more wireless protocols.

As further illustrated, a plurality of sensors 1360 may couple to SoC 1310. These sensors may include various accelerometer, environmental and other sensors, including user gesture sensors. Finally, an audio codec 1365 is coupled to SoC 1310 to provide an interface to an audio output device 1370. Of course understand that while shown with this particular implementation in FIG. 13, many variations and alternatives are possible.

Figure 14:
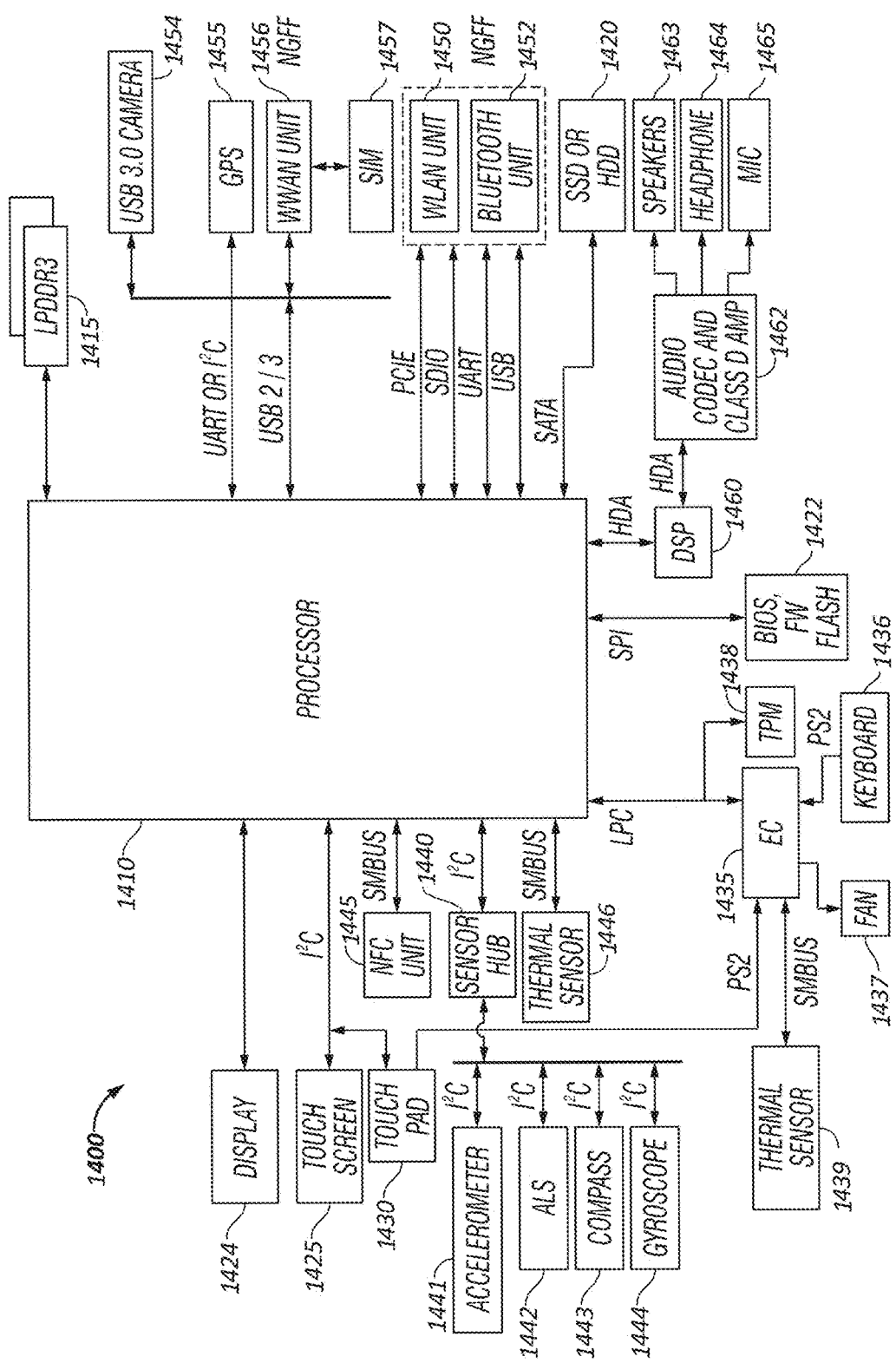
FIG. 14 is a block diagram of a representative computer system.

Referring now to FIG. 14, shown is a block diagram of a representative computer system such as notebook, Ultrabook™ or other small form factor system. A processor 1410, in one embodiment, includes a microprocessor, multi-core processor, multithreaded processor, an ultra low voltage processor, an embedded processor, or other known processing element. In the illustrated implementation, processor 1410 acts as a main processing unit and central hub for communication with many of the various components of the system 1400. As one example, processor 1400 is implemented as a SoC.

Processor 1410, in one embodiment, communicates with a system memory 1415. As an illustrative example, the system memory 1415 is implemented via multiple memory devices or modules to provide for a given amount of system memory.

To provide for persistent storage of information such as data, applications, one or more operating systems and so forth, a mass storage 1420 may also couple to processor 1410. In various embodiments, to enable a thinner and lighter system design as well as to improve system responsiveness, this mass storage may be implemented via a SSD or the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also shown in FIG. 14, a flash device 1422 may be coupled to processor 1410, e.g., via a serial peripheral interface (SPI). This flash device may provide for non-volatile storage of system software, including a basic input/output software (BIOS) as well as other firmware of the system.

Various input/output (I/O) devices may be present within system 1400. Specifically shown in the embodiment of FIG. 14 is a display 1424 which may be a high definition LCD or LED panel that further provides for a touch screen 1425. In one embodiment, display 1424 may be coupled to processor 1410 via a display interconnect that can be implemented as a high performance graphics interconnect. Touch screen 1425 may be coupled to processor 1410 via another interconnect, which in an embodiment can be an I$^2$C interconnect. As further shown in FIG. 14, in addition to touch screen 1425, user input by way of touch can also occur via a touch pad 1430 which may be configured within the chassis and may also be coupled to the same I$^2$C interconnect as touch screen 1425.

For perceptual computing and other purposes, various sensors may be present within the system and may be coupled to processor 1410 in different manners. Certain inertial and environmental sensors may couple to processor 1410 through a sensor hub 1440, e.g., via an I$^2$C interconnect. In the embodiment shown in FIG. 14, these sensors may include an accelerometer 1441, an ambient light sensor (ALS) 1442, a compass 1443 and a gyroscope 1444. Other environmental sensors may include one or more thermal sensors 1446 which in some embodiments couple to processor 1410 via a system management bus (SMBus) bus.

Also seen in FIG. 14, various peripheral devices may couple to processor 1410 via a low pin count (LPC) interconnect. In the embodiment shown, various components can be coupled through an embedded controller 1435. Such components can include a keyboard 1436 (e.g., coupled via a PS2 interface), a fan 1437, and a thermal sensor 1439. In some embodiments, touch pad 1430 may also couple to EC 1435 via a PS2 interface. In addition, a security processor such as a trusted platform module (TPM) 1438 may also couple to processor 1410 via this LPC interconnect.

System 1400 can communicate with external devices in a variety of manners, including wirelessly. In the embodiment shown in FIG. 14, various wireless modules, each of which can correspond to a radio configured for a particular wireless communication protocol, are present. One manner for wireless communication in a short range such as a near field may be via a NFC unit 1445 which may communicate, in one embodiment with processor 1410 via an SMBus. Note that via this NFC unit 1445, devices in close proximity to each other can communicate.

As further seen in FIG. 14, additional wireless units can include other short range wireless engines including a WLAN unit 1450 and a Bluetooth unit 1452. Using WLAN unit 1450, Wi-Fi™ communications can be realized, while via Bluetooth unit 1452, short range Bluetooth™ communications can occur. These units may communicate with processor 1410 via a given link.

In addition, wireless wide area communications, e.g., according to a cellular or other wireless wide area protocol, can occur via a WWAN unit 1456 which in turn may couple to a subscriber identity module (SIM) 1457. In addition, to enable receipt and use of location information, a GPS module 1455 may also be present. Note that in the embodiment shown in FIG. 14, WWAN unit 1456 and an integrated capture device such as a camera module 1454 may communicate via a given link.

An integrated camera module 1454 can be incorporated in the lid. To provide for audio inputs and outputs, an audio processor can be implemented via a digital signal processor (DSP) 1460, which may couple to processor 1410 via a high definition audio (HDA) link. Similarly, DSP 1460 may communicate with an integrated coder/decoder (CODEC) and amplifier 1462 that in turn may couple to output speakers 1463 which may be implemented within the chassis. Similarly, amplifier and CODEC 1462 can be coupled to receive audio inputs from a microphone 1465 which in an embodiment can be implemented via dual array microphones (such as a digital microphone array) to provide for high quality audio inputs to enable voice-activated control of various operations within the system. Note also that audio outputs can be provided from amplifier/CODEC 1462 to a headphone jack 1464. Although shown with these particular components in the embodiment of FIG. 14, understand the scope of the present invention is not limited in this regard.

Figure 15:
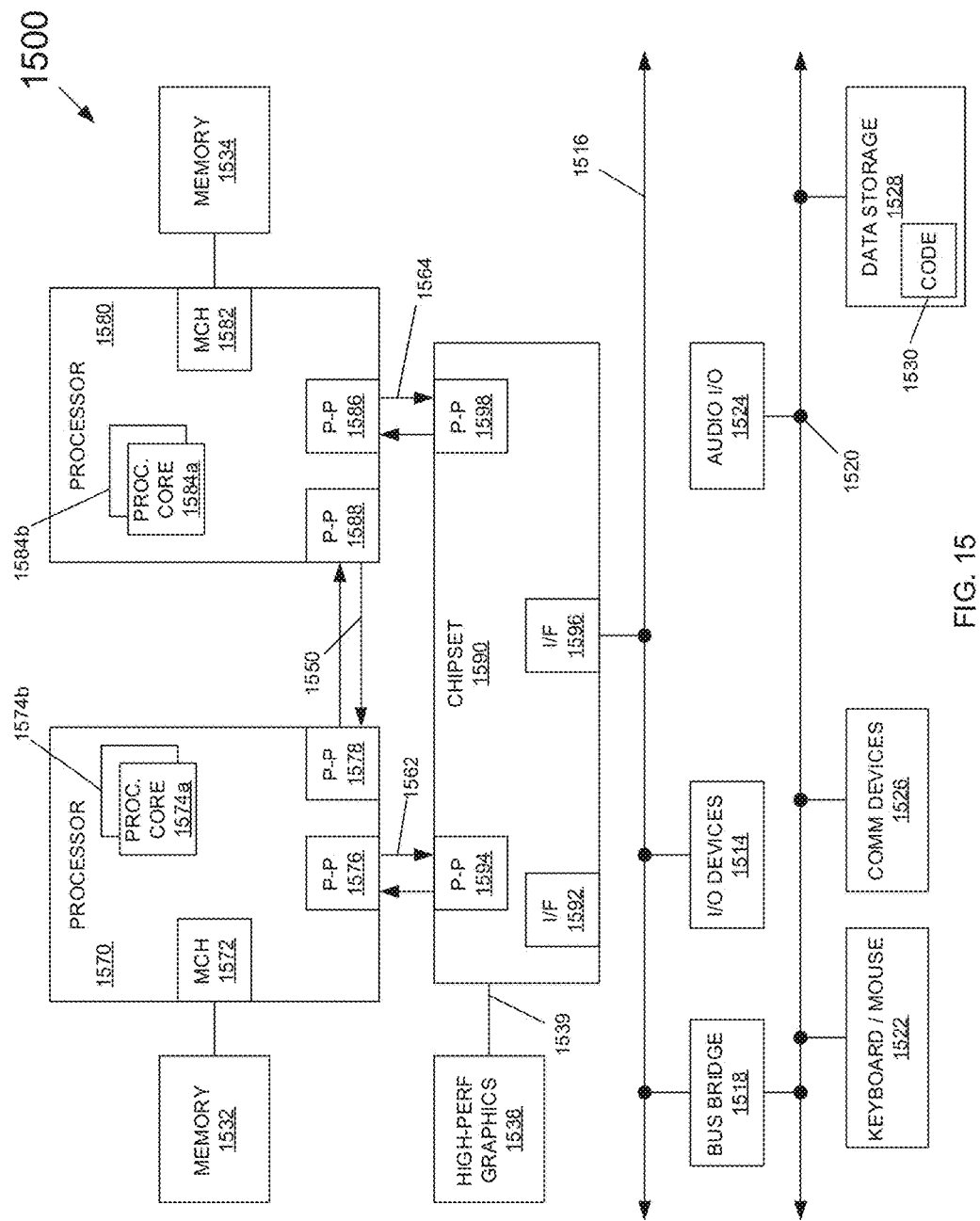
FIG. 15 is a block diagram of a system in accordance with an embodiment of the present invention.

Embodiments may be implemented in many different system types. Referring now to FIG. 15, shown is a block diagram of a system in accordance with an embodiment of the present invention. As shown in FIG. 15, multiprocessor system 1500 is a point-to-point interconnect system, and includes a first processor 1570 and a second processor 1580 coupled via a point-to-point interconnect 1550. As shown in FIG. 15, each of processors 1570 and 1580 may be multicore processors, including first and second processor cores (i.e., processor cores 1574*a* and 1574*b* and processor cores 1584*a* and 1584*b*), although potentially many more cores may be present in the processors. Each of the processors can include a PCU or other power management logic to perform processor-based power management as described herein.

Still referring to FIG. 15, first processor 1570 further includes a memory controller hub (MCH) 1572 and point-to-point (P-P) interfaces 1576 and 1578. Similarly, second processor 1580 includes a MCH 1582 and P-P interfaces 1586 and 1588. As shown in FIG. 15, MCH's 1572 and 1582 couple the processors to respective memories, namely a memory 1532 and a memory 1534, which may be portions of system memory (e.g., DRAM) locally attached to the respective processors. First processor 1570 and second processor 1580 may be coupled to a chipset 1590 via P-P interconnects 1562 and 1564, respectively. As shown in FIG. 15, chipset 1590 includes P-P interfaces 1594 and 1598.

Furthermore, chipset 1590 includes an interface 1592 to couple chipset 1590 with a high performance graphics engine 1538, by a P-P interconnect 1539. In turn, chipset 1590 may be coupled to a first bus 1516 via an interface 1596. As shown in FIG. 15, various input/output (I/O) devices 1514 may be coupled to first bus 1516, along with a bus bridge 1518 which couples first bus 1516 to a second bus 1520. Various devices may be coupled to second bus 1520 including, for example, a keyboard/mouse 1522, communication devices 1526 and a data storage unit 1528 such as a disk drive or other mass storage device which may include code 1530, in one embodiment. Further, an audio I/O 1524 may be coupled to second bus 1520. Embodiments can be incorporated into other types of systems including mobile devices such as a smart cellular telephone, tablet computer, netbook, Ultrabook™, or so forth.

A multi-chip package (MCP) may include a processor die (also processor chip herein) and a Platform Controller Hub (PCH) die (also PCH chip herein) in the same package. In order to ensure that both dies are protected from prolonged exposure to high temperatures, the MCP may have a thermal management solution, e.g., management of power dissipated by one die based on a temperature of the other die. The terms "chip" and "die" are used interchangeably herein.

In embodiments, a mechanism is employed to enable one die to cause throttling (e.g., reduction) of power consumption in the other die. Triggering by one die of throttling in the other die may be achieved using a pin-based die-to-die (e.g., chip-to-chip) connection. Such a pin-based connection can be effective at high temperatures, during which transaction flows through a main band interconnect (e.g., distinct from the pin-based die-to-die connection) between the dies may not be guaranteed.

In embodiments, throttling of a first die may be initiated to reduce temperature of the first die, and throttling of a second die (e.g., cross-die throttling) may be requested after a throttling limit of the first die is reached, e.g., additional throttling/power reduction is not possible within the first die. After die throttling, cross-die throttling provides an additional mechanism within the MCP to protect the dies of the package against high temperature.

Figure 16:
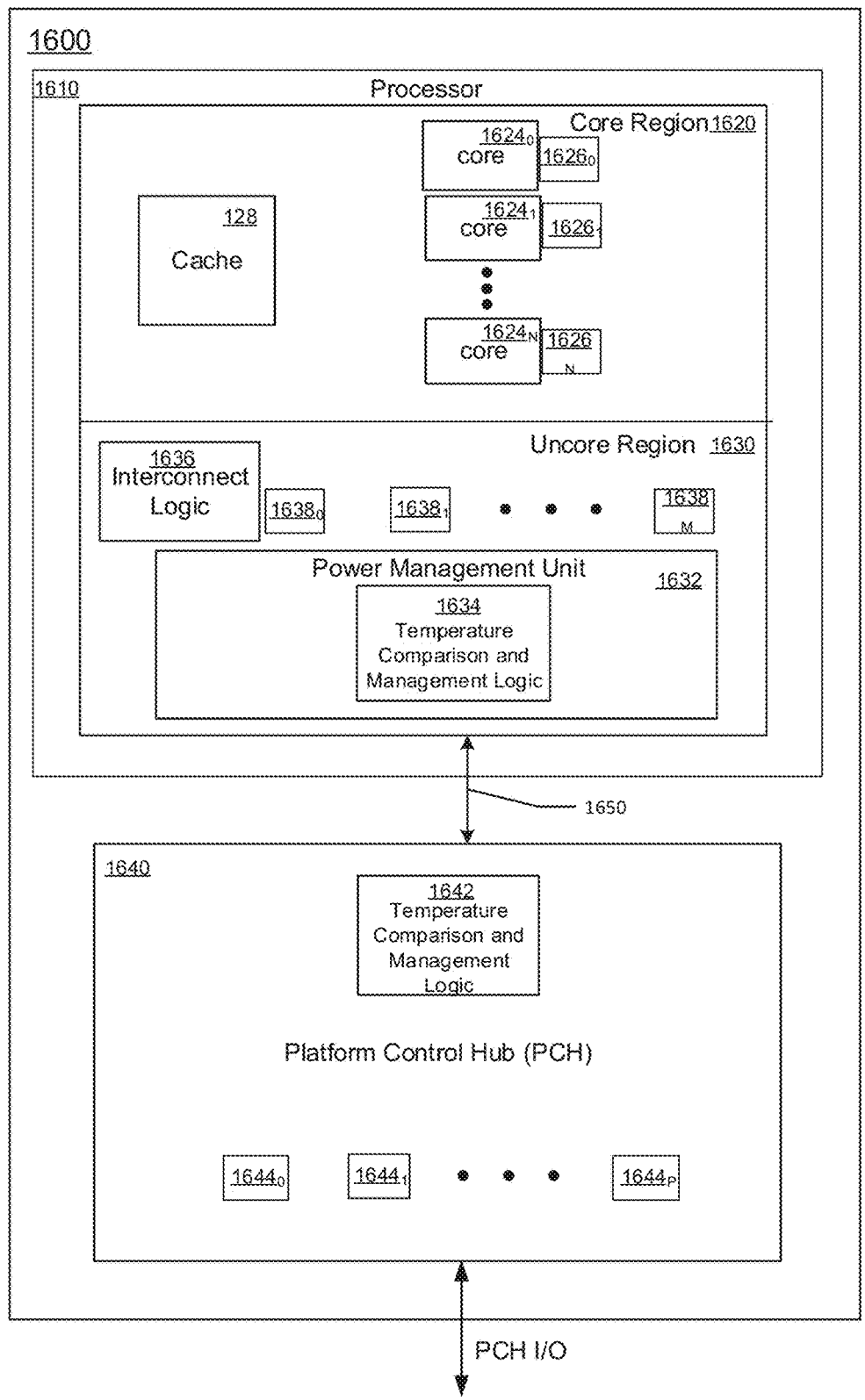
FIG. 16 is a block diagram of an apparatus, according to embodiments of the present invention.

FIG. 16 is a block diagram of a system, according to embodiments of the present invention. The system 1600 is an MCP that includes two chips: a first chip that is a processor chip 1610 (also processor herein), and a second chip that is platform controller hub (PCH) chip 1640 (also platform controller hub or PCH herein). The processor 1610 includes a core region 1620 and an uncore region 1630. The core region includes one or more cores 1624. The core region 1620 also includes a cache memory 1628, and may also include other modules (not shown), e.g., other logics. Each core $1624_i$ may have at least one temperature sensor $1626_i$ situated proximate to the core $1624_i$ to provide temperature data associated with the respective core $1624_i$. There may be additional temperature sensors $1626_i$ situated at various locations in the processor core region 1620 and the additional temperature sensors $1626_i$ may provide additional temperature data associated with other functional units of the core region 1620. Other embodiments may have less than one temperature sensor per core.

The uncore region 1630 may include one or more temperature sensors 1638 (e.g., $1638_0$-$1638_m$) that may be situated at various locations within the uncore region 1630. The uncore region 1630 may also include a power management unit 1632 that may include temperature comparison and management (TC/M) logic 1634, which may be implemented in hardware, e.g., a microcontroller, or in firmware, and/or software.

The PCH 1640 may include various control circuitry to control some data paths (e.g., USB, PCIe, etc.) and support functions used in conjunction with the processor 1620. The PCH 1640 may include TC/M logic 1642, which may be implemented in hardware (e.g., a microcontroller), and/or in firmware, and/or in software. The PCH 1640 may also include one or more temperature sensors 1644 that may be situated at various locations within the PCH.

The processor 1610 and the PCH 1640 may be coupled by a die-to-die conduit 1650, such as a pin connecting the processor 1610 and the PCH 1640. The die-to-die conduit 1650 may permit bi-directional communication between dies and may be dedicated for transmission of power adjustment messages between the processor 1610 and the PCH 1640. The die-to-die conduit 1650 may be, e.g., a conductor such as metal, or may be another dedicated pathway within the MCP 1600.

In operation, the TC/M logic 1634 may receive temperature data from the temperature sensors 1626 and 1638. For instance, the temperature sensors 1626 and 1638 may be polled periodically, aperiodically, or polling may be triggered by an event. The TC/M logic 1634 may determine, from the temperature data, whether a "hotspot" exists (e.g., a location of excessive temperature), e.g., a particular core $1624_z$ that exceeds a core temperature threshold (e.g., the core temperature threshold may be set before operation of the system 1600, based on laboratory tests and/or known characteristics of the core $1624_z$). For example, the TC/M logic 1634 may compare received temperature data from one of the temperature sensors $1626_z$ to its respective temperature threshold, and if the temperature data exceeds the threshold, the associated core $1624_z$ may be identified as a hotspot.

In response to identification of a hotspot, various throttling measures may be invoked by the TC/M logic 1634 to reduce the temperature of the hotspot. Throttling measures may include reduction of core clock frequency, reduction of core operating voltage, reduction in core duty cycle (e.g., percentage of operation time of the core $1624_z$), or other throttling measures. If a hotspot is detected within the uncore region 1630, throttling measures to be invoked may include reduction in clock frequency of the interconnect logic 1636 associated with an interconnect, e.g., ring interconnect of the processor 1610.

If the temperature of the hotspot continues to exceed its temperature threshold after one or more throttling measures are invoked by the TC/M logic 1634, the TC/M logic 1634 may generate a first power adjustment signal, to be sent to the PCH 1640, e.g., via the die-to-die conduit 1650. Upon receipt of the first power adjustment signal, the PCH 1640 may reduce its power usage through, e.g., throttling within the PCH 1640. For example, throttling within the PCH 1640 may include throttling of activity in the PCH 1640 by, e.g., reduction of a clock frequency, reduction of an operating voltage, and/or reduction of a duty cycle of the PCH 1640.

If the TC/M logic 1634 detects that the temperature of the hotspot has decreased to a value less than or equal to the respective threshold value, the TC/M logic 1634 may de-assert the first power adjustment signal. The PCH 1640 can cease throttling of activity and may resume a level of activity (e.g., functionality) at which the PCH 1640 operated prior to receipt of the first power adjustment signal.

Within the PCH 1640, TC/M logic 1642 may monitor temperature data received from one or more temperature sensors $1644_i$. The TC/M logic 1642 may conduct comparisons of temperature data received from each of the one or more temperature sensors $1644_i$, to a respective threshold value. If the TC/M logic 1642 detects that a temperature of a particular location within the PCH 1640 (as reflected in the temperature data received from a corresponding temperature sensor $1644_i$) exceeds the respective threshold value indicative of a hotspot condition within the PCH 1640, the TC/M logic 1642 may implement one or more throttling measures in the PCH 1640, e.g., reduction in clock frequency, reduction in operating voltage, and/or reduction in duty cycle of the PCH 1640. If the hotspot condition persists after the throttling measures are implemented, the TC/M logic 1642 may generate a second power reduction signal to be sent to the processor 1610 via the die-to-die conduit 1650. Responsive to receipt of the second power reduction signal, the processor 1610 may invoke one or more throttling techniques, e.g., reduction in clock frequency of some or all of the cores, reduction of operating voltage of some or all of the cores, reduction in duty cycle of some or all of the cores, etc. in order to reduce heat generated by the processor 1610, which may result in a reduction in operating temperature of the PCH 1640 within the MCP 1600. Thus, the temperature of a hotspot within a first of the dies of an MCP, such as MCP 1600, can be reduced by throttling actions within a second of the dies of the MCP. The throttling may be initiated by the first die that sends a power adjustment signal to the second die via a die-to-die conduit that is dedicated for transmission of power adjustment signals.

In an embodiment, in order to evaluate the system following a change in operating parameters, e.g., after one of the dies is throttled, a time delay τ (relaxation time) may be invoked subsequent to the change in operating parameters, after which temperature data is collected.

In other embodiments (not shown), the MCP may include three or more chips. The additional chips may be, e.g., memory chips, network interface (NIC) chips, or other chips. For example, there may be a processor and two additional chips in the MCP, and one dedicated pin (e.g., open-drain bi-directional pin) may couple the processor to each of the additional chips, for communication of power reduction signals between the processor and one or more of the additional chips, according to embodiments of the present invention. In one embodiment, responsive to the processor exceeding a thermal threshold, the processor may transmit a first power reduction signal to each of a second chip and a third chip. In another embodiment responsive to the processor exceeding a thermal threshold, the processor may transmit a first power reduction signal to a first of the additional chips, and may transmit a second power reduction signal to a second of the additional chips.

In another embodiment, a measured temperature value of the processor that exceeds a first thermal threshold may cause transmission of the first power reduction signal to the first additional chip, and when the measured temperature value exceeds a second thermal threshold, transmission of a second power reduction signal to the second additional chip may occur. After power reduction of the additional chip(s), responsive to detection that the measured temperature value is less than or equal to the second thermal threshold, the second power reduction signal may be de-asserted. Upon detection that the measured temperature value is less than or equal to the first thermal threshold, the first power reduction signal and the second power reduction signal may be de-asserted.

Figure 17:
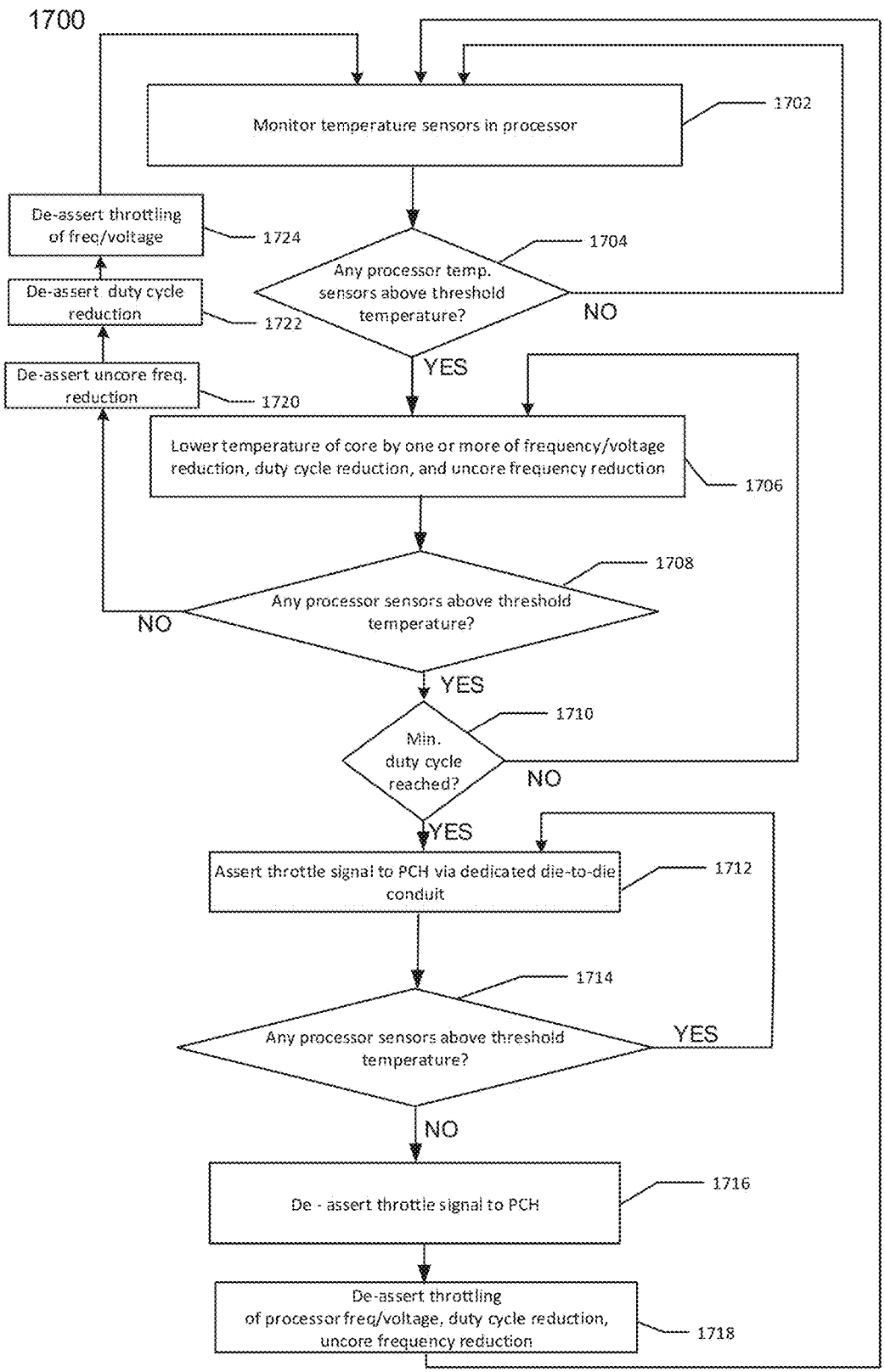
FIG. 17 is a flow diagram of a method, according to embodiments of the present invention.

FIG. 17 is a flow diagram of a method 1700, according to embodiments of the present invention. At block 1702, temperature sensors within a processor of an MCP are monitored by e.g., TC/M logic of the processor. Continuing to decision diamond 1704, if there are no processor temperature sensors whose measured temperature exceeds a respective threshold temperature, the method returns to block 1702. If the temperature measured by one of the processor temperature sensors exceeds its respective threshold temperature, advancing to block 1706 the TC/M logic lowers the temperature of the core by throttling, e.g., frequency and/or voltage reduction of a corresponding core, reduction of duty cycle, and/or reduction in uncore operating frequency of an uncore of the processor. For example, in one embodiment, an initial throttling stage may include throttling of the frequency and/or voltage, which may be followed in a second throttling stage by duty cycle reduction, and finally in a third throttling stage by uncore frequency reduction. For each change implemented, the temperature of the hotspot may be monitored (e.g., after a relaxation time τ has passed) to determine whether additional throttling measures are to be implemented.

Moving to decision diamond 1708, if updated temperature data indicate that no hotspots exist in the processor (e.g., none of the processor sensors have a temperature that exceeds a respective threshold temperature), proceeding to blocks 1720, 1722, and 1724, throttling of uncore frequency, duty cycle, and frequency/voltage of one or more cores are de-asserted and each core is returned to operation according to its original operating parameters.

Back at decision block 1708, if one of the temperature sensors in the processor is above its threshold value, continuing to decision diamond 1710 if the minimum duty cycle of the corresponding core has not been reached, returning to block 1706 the duty cycle of the hotspot core is again reduced, and following the reduction, proceeding to block 1708 temperature data is again compared to the respective threshold temperature. If the hotspot condition persists and the minimum duty cycle is reached, advancing to block 1712, the TC/M logic of the processor asserts a throttle signal (temperature adjustment signal) to a PCH of the MCP via a die-to-die conduit that is dedicated for transport of temperature adjustment signals between dies of the MCP. The PCH receives the throttle signal and may throttle its operation, e.g., by reduction of PCH clock frequency.

After the PCH is throttled, at decision block 1714 if temperature data from one of the processor temperature sensors indicates that the hotspot condition persists, returning to block 1712 throttle signal remains asserted and the temperature data from the processor temperature sensors continues to be monitored. When all of the temperature sensors of the processor indicate that no hotspot condition is present in the processor, advancing to block 1716 the TC/M logic de-asserts the throttle signal sent to the PCH via the dedicated die-to-die conduit. Moving to block 1718, throttling of core frequency and voltage is de-asserted, duty cycle reduction of the cores is de-asserted, and uncore frequency reduction is de-asserted. Returning to block 1702, the temperature sensors within the processor continue to be monitored for excessive temperature.

Figure 18:
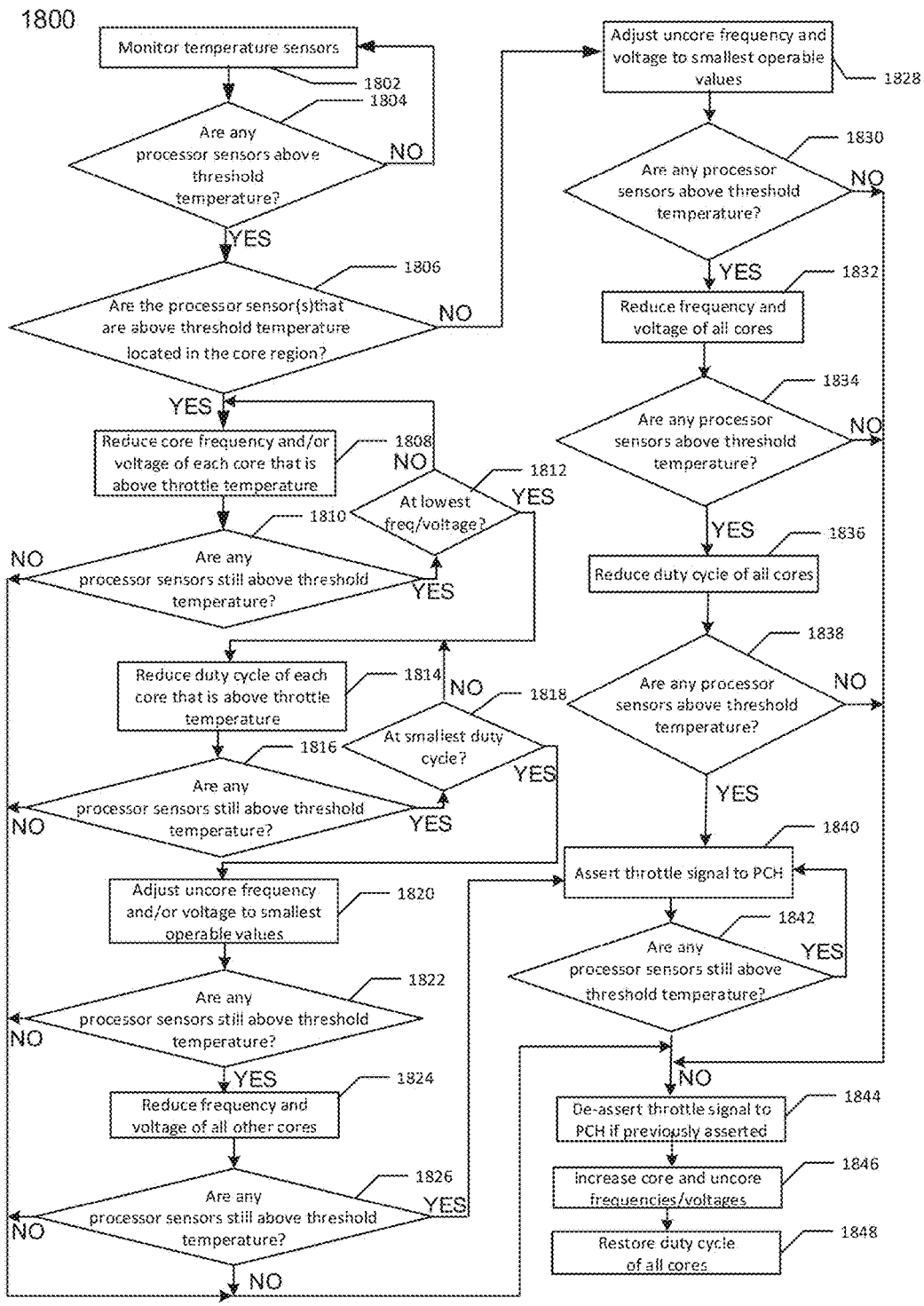
FIG. 18 is a flow diagram of another method, according to embodiments of the present invention.

FIG. 18 is a flow diagram of another method 1800, according to embodiments of the present invention. The method of FIG. 18 presents a detailed picture of throttling, according to an embodiment of the present invention.

At block 1802, temperature sensors of a processor of a first die within an MCP are monitored. Continuing to block 1804, if any processor temperature sensors of the first die are above a (programmed) threshold temperature, advancing to decision diamond 1806 if the sensor whose data indicates that it is above the respective threshold temperature is located in a core region of the processor, moving to block 1808 a frequency and/or voltage of a core whose temperature (e.g., as indicated by its respective temperature sensor) is above its respective threshold temperature, is throttled (e.g., reduced).

Advancing to decision diamond 1810, if any of the processor temperature sensors persist in being greater than their respective thresholds, if the corresponding core is not yet operating at its lowest frequency and voltage (as determined in decision diamond 1812), returning to block 1808 an additional reduction of frequency and/or voltage is invoked.

If the hotspot(s) persist after operation of the respective core(s) at their lowest operable frequency and voltage, proceeding to block 1814 a duty cycle of each hotspot core is reduced. Continuing to decision diamond 1816, if the hotspot(s) persist, the duty cycle is again reduced (at decision diamond 1818) if the smallest duty cycle has not been reached. If the smallest duty cycle of the hotspot core has been reached and the hotspot persists, advancing to block 1820 a frequency and/or voltage of the uncore (e.g., interconnect logic) are reduced to their smallest operating values, and at decision diamond 1822 the temperatures of the cores are again compared with their respective threshold values. If at decision diamond 1822 one or more processor temperatures are above a respective threshold temperature, moving to block 1824 frequency and voltage of all other cores of the first die are reduced. Proceeding to decision diamond 1826, if any of the processor temperature sensors is above the threshold temperature (e.g., one or more hotspots persist), continuing to block 1840 a throttle signal is asserted, e.g., sent to a second die of the MCP (e.g., a PCH) from the processor, e.g., via a dedicated die-to-die conduit capable of two way communication between the dies. The throttle signal is received by the PCH and throttling of the PCH ensues. Advancing to decision diamond 1842, if all of the processor temperature sensors indicate that their respective temperatures are less than or equal to their respective threshold temperature, proceeding to blocks 1844, 1846, and 1848, the throttle signal to the PCH is de-asserted, the core and uncore frequencies and voltages are re-instated, and the duty cycles of all cores are re-instated.

Back at decision diamond 1806, if one or more of the sensors that are above their respective threshold levels are located in the uncore, continuing to block 1828 the uncore frequency and voltage are adjusted to their smallest operable values. Advancing to decision diamond 1830, if any hotspots persist in the uncore, moving to block 1832 the frequency and voltage of all cores are reduced. If any hotspots persist (as determined in decision diamond 1834), proceeding to block 1836 the duty cycle of each core is reduced. Continuing to decision diamond 1838, if any hotspot persists, advancing to block 1840 the throttle signal is asserted to the second die (e.g., PCH) from the processor via the dedicated die-to-die conduit. If any hotspots persist, returning to block 1840 the throttle signal continues to be asserted in the PCH. If no hotspots persist after the PCH is throttled, at blocks 1844, 1846, 1848, the PCH throttle signal is de-asserted, the core and uncore frequencies and voltages are restored, and the duty cycle of each core is restored.

At any point of the method, if all of the processor temperature sensors are less than or equal to their respective thresholds, proceeding to block 1844, a throttle signal previously asserted to the second die (PCH) of the MCP transmitted via, e.g., dedicated two-way pin is de-asserted and moving to block 1846, the core and uncore frequencies and voltages are restored to pre-throttling levels. Advancing to block 1848, the respective duty cycle of each core is restored to its pre-throttled duty cycle.

Figure 19:
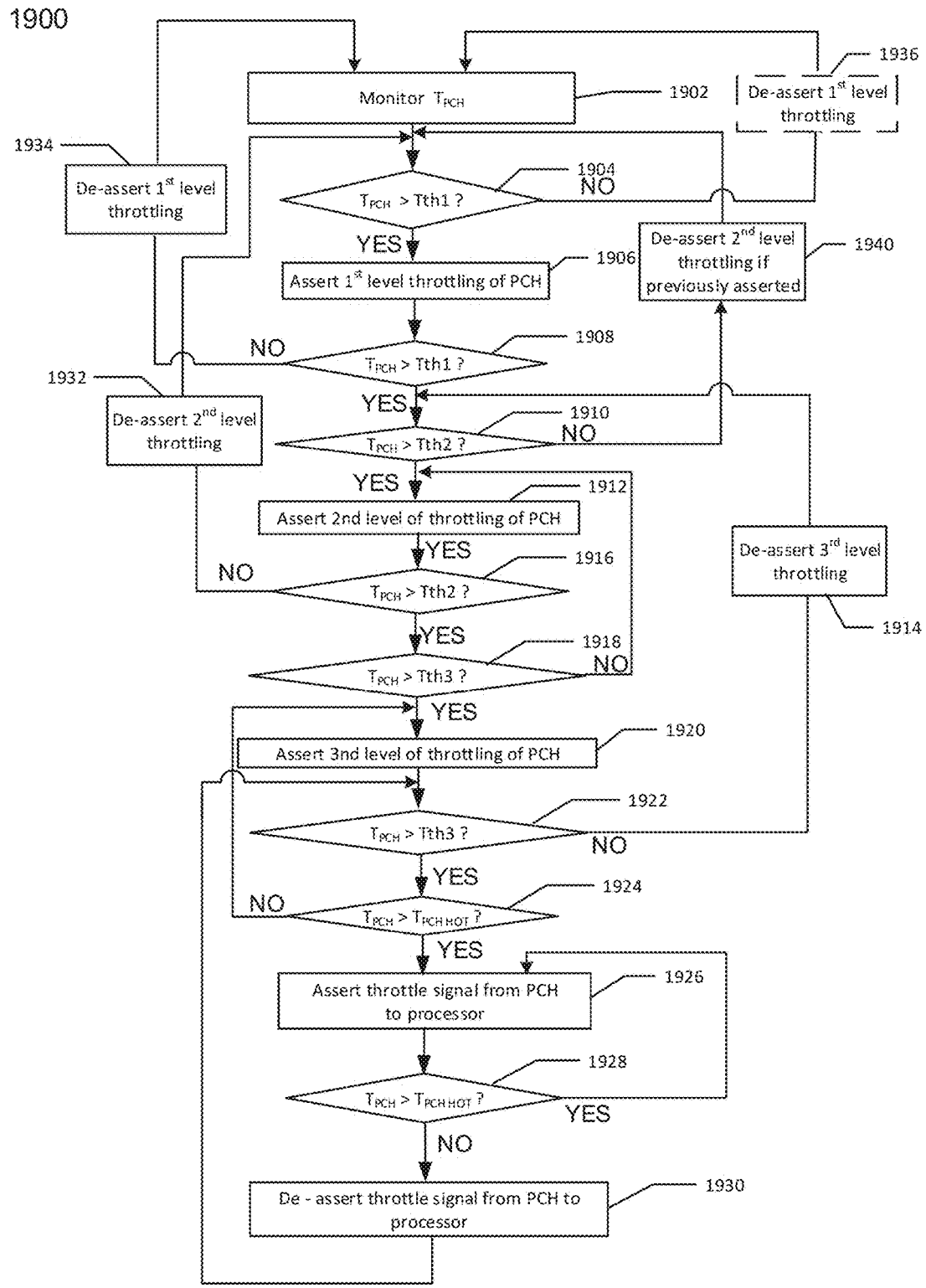
FIG. 19 is a flow diagram of another method, according to embodiments of the present invention.

FIG. 19 is a flow diagram of another method 1900, according to embodiments of the present invention. At block 1902, one or more temperature sensors are monitored in a second die (e.g., PCH chip) of an MCP that includes a first die (e.g., processor chip) and the second die. In other embodiments, the MCP may include additional chips.

Continuing to decision diamond 1904, if a PCH temperature $T_{PCH}$ (e.g., a largest measured value of the PCH temperature sensors) is less than a first threshold temperature $T_{th1}$, and if a first level of throttling of the PCH had been previously asserted (e.g., due to an earlier hotspot condition), at block 1936 the first level throttling is de-asserted. Returning to block 1902, monitoring of $T_{PCH}$ continues.

If, at decision diamond 1904, $T_{PCH}$ is greater than the first threshold temperature $T_{th1}$, advancing to block 1906 the first level of throttling is asserted in the PCH. For example, the first level of throttling may include reduction of a duty cycle of the PCH, e.g., reduction of a percentage of active (e.g., "on") time of the PCH. Moving to decision diamond 1908, if, after assertion of the first level of throttling, $T_{PCH}$ is less than or equal to $T_{th1}$ (e.g., as indicated by the PCH temperature sensors), proceeding to block 1934 the first level throttling is de-asserted, and returning to block 1902 monitoring of the PCH temperature $T_{PCH}$ continues.

Again at decision diamond 1908, if $T_{PCH}$ persists in being greater than $T_{th1}$, as indicated by one or more of the PCH temperature sensors, proceeding to decision diamond 1910 $T_{PCH}$ is compared with a second threshold temperature $T_{th2}$ (e.g., greater than $T_{th1}$), and if $T_{PCH}$ is less than or equal to $T_{th2}$, returning to decision diamond 1904 if $T_{PCH}$ is greater than $T_{th1}$, continuing to block 1906 first level throttling continues to be asserted.

If, at decision diamond 1910, $T_{PCH}$ is greater than $T_{th2}$, continuing to block 1912 a second level of throttling of the PCH (e.g., greater than the first level of throttling of the PCH) is asserted. Advancing to decision diamond 1916, if $T_{PCH}$ is less than or equal to $T_{th2}$, moving to block 1932 the second level of throttling of the PCH is de-asserted, after which, proceeding to decision diamond 1904, it is determined whether $T_{PCH}$ is greater than $T_{th1}$. An outcome of decision diamond 1904 determines whether to continue to assert first level throttling of the PCH, or to de-assert the first level throttling of the PCH and return to block 1902 and continue to monitor $T_{PCH}$.

Again at decision diamond 1916, if $T_{PCH}$ is greater than $T_{th2}$, proceeding to decision diamond 1918 if $T_{PCH}$ is less than or equal to a third threshold temperature $T_{th3}$, returning to block 1912 the second level of throttling of the PCH is asserted. If at decision diamond 1918, $T_{PCH}$ is greater than $T_{th3}$, a third level of throttling of the PCH is asserted at block 1920.

Continuing to decision diamond 1922, if $T_{PCH}$ is greater than $T_{th3}$, moving to decision diamond 1924 if $T_{PCH}$ is greater than $T_{PCH\ HOT}$ (e.g., a fourth threshold temperature, such as a highest safe operating temperature of the PCH), proceeding to block 1926 a throttle signal is asserted from the PCH to the first die (e.g., the processor chip), e.g., via a two-way die-to-die conduit that is dedicated for transport of temperature adjustment signals between the processor chip and the PCH chip of the MCP. After the throttle signal is asserted in the processor, at decision diamond 1928 if $T_{PCH}$ continues to be greater than $T_{PCH\ HOT}$, the throttle signal to the processor chip continues to be asserted (block 1926). If, at decision diamond 1928, $T_{PCH}$ is less than or equal to $T_{PCH\ HOT}$, advancing to block 1930 the throttle signal from the PCH to the processor is de-asserted and returning to decision diamond 1922, if $T_{PCH}$ is greater than $T_{th3}$ returning to block 1920 the third level of throttling of the PCH continues to be asserted.

If, at decision diamond 1922, $T_{PCH}$ is less than or equal to $T_{th3}$, moving to block 1914 the third level of throttling is de-asserted, and returning to decision diamond 1910 $T_{PCH}$ is compared with $T_{th2}$. If $T_{PCH}$ is greater than $T_{th2}$ the second level of throttling continues to be asserted, at block 1912. If $T_{PCH}$ is less than or equal to $T_{th2}$, the second level of throttling is de-asserted at block 1932, and $T_{PCH}$ is compared with $T_{th1}$, at decision diamond 1904. If $T_{PCH}$ is greater than $T_{th1}$, the first level of throttling of the PCH is asserted, at block 1906. If $T_{PCH}$ is less than or equal to $T_{th1}$, moving to block 1936 the first level of throttling is de-asserted and returning to block 1902, temperature sensors continue to be monitored in the PCH chip.

Additional embodiments are described below.

In a first example, a processor includes a first chip of a multi-chip package (MCP). The first chip includes at least one core and first chip temperature control (TC) logic to assert a first power adjustment signal at a second chip of the MCP responsive to an indication that a first chip temperature of the first chip exceeds a first threshold. The processor also includes a conduit including a bi-directional pin to couple the first chip to a second chip within the MCP. The conduit is to transport the first power adjustment signal from the first chip to the second chip and the first power adjustment signal is to cause an adjustment of a second chip power consumption of the second chip.

In a second example that includes elements of the 1$^{st}$ example, the first chip TC logic is to throttle at least one of the at least one core responsive to a first comparison that indicates that the first chip temperature exceeds the first threshold, and after the at least one core is throttled the first chip TC logic is to generate the first power adjustment signal responsive to a second comparison that indicates that the first chip temperature continues to exceed the first threshold.

In a 3$^{rd}$ example that includes elements of the 1$^{st}$ example, adjustment of the second chip power consumption includes reduction of power consumed by the second chip.

In a 4$^{th}$ example that includes elements of the 3$^{rd}$ example, after the power consumed by the second chip is reduced, responsive to a third comparison that indicates that the first chip temperature is less than or equal to the first threshold, the first chip TC logic is to de-assert the first power adjustment signal.

In a 5$^{th}$ example that includes elements of the 1$^{st}$ example, the first chip is to receive, via the conduit, a second power adjustment signal responsive to an indication that a second chip temperature of the second chip exceeds a second threshold. The second power adjustment signal, upon receipt by the first chip, is to result in adjustment of a first chip power consumption of the first chip.

In a 6$^{th}$ example that includes elements of the 5$^{th}$ example, the first chip is to receive the second power adjustment signal from the second chip after the second chip has adjusted a second chip power consumption of the second chip and when after adjustment of the second chip power consumption, the second chip temperature continues to exceed the second threshold.

In a 7$^{th}$ example that includes elements of the 5$^{th}$ example, after the second power adjustment signal is received by the first chip, responsive to the second chip temperature being less than or equal to the second threshold the second power adjustment signal is de-asserted.

An 8$^{th}$ example any one of claims 1 to 7, the processor further includes at least one temperature sensor to measure the first chip temperature. The at least one temperature sensor is to be located proximate to the first chip.

A 9$^{th}$ example is a multi-chip package (MCP) that includes a first chip that includes a processor including at least one core, and temperature control (TC) logic to generate a first power adjustment signal to be asserted at a second chip of the MCP responsive to a first indication that a first chip temperature of the first chip exceeds a first temperature threshold. The MCP also includes a conduit that includes a bi-directional pin to couple the first chip and the second chip. The conduit is to transport the first power adjustment signal from the first chip to the second chip. The MCP also includes the second chip that includes second chip logic to, responsive to receipt of the first power adjustment signal, adjust a second chip power consumption of the second chip.

A 10$^{th}$ example includes elements of the 9$^{th}$ example and further includes a third chip coupled to the first chip via the conduit. The first power adjustment signal is to be asserted, via the conduit, at the third chip of the MCP responsive to the first indication that the first chip temperature of the first chip exceeds the first temperature threshold, and responsive to receipt of the first power adjustment signal the third chip is to adjust a third chip power consumption of the third chip.

An 11$^{th}$ example includes elements of the 10$^{th}$ example. Additionally, after the third chip power consumption is adjusted, responsive to a second indication that the first chip temperature is less than or equal to the first threshold, the TC logic is to de-assert the first power adjustment signal.

A 12$^{th}$ example includes any one of examples 9 to 11, where the second chip logic is to adjust the second chip power consumption by throttling second chip activity.

A 13$^{th}$ example includes elements of any one of examples 9 to 11, where after the second chip power consumption is adjusted, responsive to a second indication that the first chip temperature is less than or equal to the first temperature threshold, the TC logic is to de-assert the first power adjustment signal.

A 14$^{th}$ example is a machine-readable medium having stored thereon data, which if used by at least one machine, causes the at least one machine to fabricate at least one integrated circuit to perform a method that includes monitoring a first temperature of a first chip of a multi-chip processor (MCP), and responsive to a first indication that the first temperature exceeds a first threshold, throttling first chip power consumption of the first chip; after the first chip power consumption is throttled, responsive to a second indication that the first temperature continues to exceed the first threshold, asserting a first power adjustment signal by the first chip and transmitting the first power adjustment signal to a second chip of the MCP via a conduit that includes a bi-directional pin to couple the first chip and the second chip, and responsive to receipt by the second chip of the first power adjustment signal, second chip power consumption of the second chip is throttled.

A 15$^{th}$ example includes elements of the 14$^{th}$ example. The method further includes monitoring a second temperature associated with the second chip of the MCP, and responsive to the second temperature being greater than a second threshold, throttling, by the second chip, second chip power consumption. The method includes responsive to the second temperature being greater than the second threshold after the second chip power consumption is throttled, asserting a second power adjustment signal including transmitting the second power adjustment signal from the second chip to the first chip via the conduit, where upon receipt by the first chip of the second power adjustment signal the first chip power consumption is to be throttled.

A 16$^{th}$ example includes elements of the 15$^{th}$ example. The method further includes after the second power adjustment signal is transmitted and responsive to the second temperature being less than or equal to the second threshold, de-asserting the second power adjustment signal.

A 17$^{th}$ example includes elements of any one of examples 14 to 16. Additionally, the method includes responsive to a third indication that the first temperature is less than or equal to the first threshold after the first power adjustment signal has been transmitted, de-asserting by the first chip, the first power adjustment signal.

An 18$^{th}$ example includes elements of any one of examples 14 to 16. The first chip includes a processor that includes a first core, and throttling the first chip power consumption includes reduction of at least one of a first core clock frequency of the first core and a first core operating voltage of the first core.

A 19$^{th}$ example includes elements of any one of examples 14 to 16. The first chip includes a processor that includes a first core, and throttling the first chip power consumption includes reduction of a duty cycle of the first core.

A 20th example includes elements of any one of examples 14 to 16. The first chip includes a processor and throttling the first chip power consumption includes reduction of a clock frequency of an interconnect of the processor.

A 21st example is a method that includes monitoring, by temperature logic within a first chip of a multi-chip package (MCP), a first temperature of the first chip, and responsive the first temperature being greater than a first threshold reducing first chip power consumption of the first chip. The method includes after the first chip power consumption is reduced, determining whether the first temperature continues to exceed the first threshold. The method includes responsive to the first temperature being greater than the first threshold after the first chip power consumption is reduced, transmitting a first power adjustment signal from the first chip to a second chip of the MCP via a conduit that includes a bi-directional pin to couple the first chip and the second chip. The first power adjustment signal is to be asserted at the second chip. The method includes responsive to assertion of the first power adjustment signal at the second chip, reducing second chip power consumption of the second chip.

A 22nd example includes elements of the 21st example. The method further includes responsive to the first temperature being less than or equal to the first threshold after the first power adjustment signal has been asserted, de-asserting the first power adjustment signal.

A 23rd example includes elements of the 21st example, and further includes monitoring a second temperature of the second chip of the MCP, and responsive to the second temperature being greater than a second threshold reducing second chip power consumption of the second chip. The method further includes after the second chip power consumption is reduced, determining whether the second temperature continues to exceed the second threshold, and responsive to the second temperature being greater than the second threshold after the second chip power consumption is reduced, transmitting a second power adjustment signal from the second chip to the first chip via the conduit to be asserted in the first chip, where upon receipt by the first chip of the second power adjustment signal the first chip power consumption is throttled.

A 24th example includes elements of the 23rd example, and further includes after the second power adjustment signal is sent and responsive to the second temperature being less than or equal to the second threshold, de-asserting the second power adjustment signal.

A 25th example includes elements of any one of examples 21 to 24, where the first chip includes a processor that includes a first core, and where reducing the first chip power consumption includes at least one of reduction of a first core clock frequency of the first core and reduction of a first core operating voltage of the first core.

A 26th example includes elements of any one of examples 21 to 24, where the first chip includes a processor that includes a first core, and where reducing the first chip power consumption includes reduction of a duty cycle of the first core.

A 27th example includes elements of any one of examples 21 to 24, where the first chip includes a processor, and wherein reducing the first chip power consumption includes reduction of a clock frequency of an interconnect of the processor.

A 28th example is an apparatus that includes means for performing the method of any one of examples 21 to 24.

A 29th example is an apparatus to perform the method of any one of examples 21 to 24.

A 30th example is an apparatus that includes means for monitoring a first temperature of a first chip of a multi-chip package (MCP), means for reducing first chip power consumption of the first chip responsive to an indication that the first temperature exceeds a first threshold, means for determining whether the first temperature continues to exceed the first threshold after the first chip power consumption is reduced, means for transmitting a first power adjustment signal from the first chip to a second chip of the MCP via a conduit that comprises a bi-directional pin to couple the first chip and the second chip responsive to an indication that the first temperature continues to exceed the first threshold after the first chip power consumption is reduced, and means for reducing second chip power consumption of the second chip responsive to assertion of the first power adjustment signal at the second chip.

A 31st example includes elements of the 30th example, and further includes means for de-asserting the first power adjustment signal responsive to the first temperature being less than or equal to the first threshold after the first power adjustment signal has been transmitted.

A 32nd example includes elements of the 30th example, and further includes means for monitoring a second temperature of the second chip of the MCP, means for reducing second chip power consumption of the second chip responsive to the second temperature being greater than a second threshold, means for determining whether the second temperature continues to exceed the second threshold after the second chip power consumption is reduced, and means for transmitting a second power adjustment signal from the second chip to the first chip via the conduit responsive to the second temperature being greater than the second threshold after the second chip power consumption is throttled. Upon assertion at the first chip of the second power adjustment signal the first chip power consumption is to be reduced.

A 33rd example includes elements of the 32nd example, and further includes means for de-asserting the second power adjustment signal after the second power adjustment signal is transmitted responsive to the second temperature being less than or equal to the second threshold.

A 34th example includes elements of any one of examples 30 to 33. Additionally, the first chip includes a processor that includes a first core, and the means for reducing the first chip power consumption includes at least one of means for reducing a first core clock frequency of the first core and means for reducing a first core operating voltage of the first core.

A 35th example includes elements of any one of examples 30 to 33. Additionally, the first chip includes a processor that includes a first core, and the means for reducing the first chip power consumption includes means for reducing a duty cycle of the first core.

A 36th example includes elements of any one of examples 30 to 33. Further, the first chip includes a processor, and the means for reducing the first chip power consumption includes means for reducing a clock frequency of an interconnect of the processor.

Embodiments may be used in many different types of systems. For example, in one embodiment a communication device can be arranged to perform the various methods and techniques described herein. Of course, the scope of the present invention is not limited to a communication device. Instead, other embodiments can be directed to other types of apparatus for processing instructions, or one or more machine readable media including instructions that in response to being executed on a computing device, cause the device to carry out one or more of the methods and techniques described herein, or one or more machine-readable media having stored thereon data, which if used by at least one machine, causes the at least one machine to fabricate at least one integrated circuit to perform one or more of the methods and/or techniques described herein.

Embodiments may be implemented in code and may be stored on a non-transitory storage medium having stored thereon instructions which can be used to program a system to perform the instructions. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A processor comprising:
a multi-chip package (MCP) including a first chip, a second chip, and a die-to-die conduit, wherein the die-to-die conduit is a dedicated pathway of the MCP only for transmission of power adjustment signals between the first chip and the second chip, wherein the first chip includes a plurality of cores and an uncore region, the plurality of cores comprising a first core and at least one other core linked by a ring interconnect of the first chip, the uncore region of the first chip comprising first chip ring interconnect logic and a first chip temperature control (TC) logic to, in response to an indication that a first core temperature of the first core exceeds a first threshold:
perform a plurality of throttling measures to reduce power consumption of the first core of the first chip; and
subsequent to a completion of the plurality of throttling measures to reduce power consumption of the first core, reduce a clock frequency of the first chip ring interconnect logic in the uncore region of the first chip;
subsequent to a completion of a reduction of the clock frequency of the first chip ring interconnect logic in the uncore region of the first chip, send a first power adjustment signal to the second chip via the die-to-die conduit of the MCP, wherein the first power adjustment signal is to cause an adjustment of a second chip power consumption of the second chip.

2. The processor of claim 1, wherein the die-to-die conduit of the MCP is isolated from the ring interconnect of the first chip.

3. The processor of claim 1, wherein the first chip TC logic is to:
subsequent to the completion of the reduction of the clock frequency of the first chip ring interconnect logic in the uncore region of the first chip, perform one or more throttling measures to reduce power consumption of the at least one other core of the first chip,
wherein the first power adjustment signal is asserted subsequent to a completion of the one or more throttling measures to reduce power consumption of the at least one other core.

4. The processor of claim 3, wherein the plurality of throttling measures to reduce power consumption of the first core comprise at least one of a frequency reduction and a voltage reduction for the first core, and wherein the one or more throttling measures to reduce power consumption of the at least one other core comprise at least one of a frequency reduction and a voltage reduction for the at least one other core.

5. The processor of claim 1, wherein the first chip is to receive, via the die-to-die conduit, a second power adjustment signal responsive to an indication that a second chip temperature of the second chip exceeds a second threshold, wherein receipt of the second power adjustment signal by the first chip is to result in adjustment of a first chip power consumption of the first chip.

6. The processor of claim 5, wherein the first chip is to receive the receive the second power adjustment signal from the second chip after the second chip has adjusted a second chip power consumption of the second chip and when after adjustment of the second chip power consumption, the second chip temperature continues to exceed the second threshold.

7. The processor of claim 5, wherein after the second power adjustment signal is received by the first chip, responsive to the second chip temperature being less than or equal to the second threshold, the second power adjustment signal is de-asserted.

8. The processor of claim 1, further comprising at least one temperature sensor to measure the first chip temperature, wherein the at least one temperature sensor is to be located proximate to the first chip.

9. A multi-chip package (MCP) comprising:
a first chip, a second chip, and a die-to-die conduit;
wherein the die-to-die conduit is a dedicated pathway of the MCP only for transmission of power adjustment signals between the first chip and the second chip;
wherein the first chip includes a processor including a plurality of cores and an uncore region, the plurality of cores comprising a first core and at least one other core linked by a ring interconnect of the first chip, the uncore region of the first chip comprising first chip ring interconnect logic and a temperature control (TC) logic to, in response to a first comparison that indicates that a temperature of the first core exceeds a first threshold:
perform a plurality of throttling measures to reduce power consumption of the first core of the first chip; and
after a completion of the plurality of throttling measures to reduce power consumption of the first core, reduce a clock frequency of the first chip ring interconnect logic in the uncore region of the first chip;
after a completion of a reduction of the clock frequency of the first chip ring interconnect logic in the uncore region of the first chip, generate a first power adjustment signal to be transmitted to the second chip via the die-to-die conduit of the MCP; and
wherein the second chip includes second chip logic to adjust a second chip power consumption of the second chip responsive to receipt of the first power adjustment signal.

10. The MCP of claim 9, wherein the die-to-die conduit of the MCP is isolated from the ring interconnect of the first chip.

11. The MCP of claim 9, wherein the TC logic is to:
after the completion of the reduction of the clock frequency of the first chip ring interconnect logic in the uncore region of the first chip, perform one or more throttling measures to reduce power consumption of the at least one other core of the first chip,
wherein the first power adjustment signal is asserted after a completion of the one or more throttling measures to reduce power consumption of the at least one other core.

12. The MCP of claim 11, wherein the plurality of throttling measures to reduce power consumption of the first core comprise at least one of a frequency reduction and a voltage reduction for the first core, and wherein the one or more throttling measures to reduce power consumption of the at least one other core comprise at least one of a frequency reduction and a voltage reduction for the at least one other core.

13. The MCP of claim 9, wherein, responsive to a second comparison that indicates that the temperature of the first core is less than or equal to the first threshold, the TC logic is to de-assert the first power adjustment signal.

14. A non-transitory machine-readable medium having stored thereon data, which if used by at least one machine, causes the at least one machine to fabricate at least one integrated circuit to perform a method comprising:
monitoring a first temperature of a first core in a first chip of a multi-chip processor (MCP), wherein the MCP includes a second chip and a die-to-die conduit, wherein the die-to-die conduit is a dedicated pathway of the MCP only for transmission of power adjustment signals between the first chip and the second chip, wherein the first chip includes a plurality of cores and an uncore region, the uncore region of the first chip comprising first chip ring interconnect logic, the plurality of cores comprising the first core and at least one other core linked by a ring interconnect of the first chip;
responsive to a first indication that the first temperature exceeds a first threshold:
performing a plurality of measures for throttling power consumption of the first core;
after a completion of the plurality of measures for throttling power consumption of the first core, responsive to a second indication that the first temperature continues to exceed the first threshold, reduce a clock frequency of the first chip ring interconnect logic in the uncore region of the first chip;
after a completion of a reduction of the clock frequency of the first chip ring interconnect logic in the uncore region of the first chip, responsive to a third indication that the first temperature continues to exceed the first threshold, asserting a first power adjustment signal by the first chip and transmitting the first power adjustment signal to the second chip of the MCP via the die-to-die conduit of the MCP, second chip; and
wherein responsive to receipt by the second chip of the first power adjustment signal, second chip power consumption of the second chip is to be throttled.

15. The machine-readable medium of claim 14, wherein the die-to-die conduit is isolated from the ring interconnect of the first chip.

16. The machine-readable medium of claim 14, wherein the method further includes:
after the completion of the reduction of the clock frequency of the first chip ring interconnect logic in the uncore region of the first chip, performing one or more measures for throttling power consumption of the at least one other core of the first chip,
wherein the first power adjustment signal is asserted after a completion of the one or more measures for throttling power consumption of the at least one other core of the first chip.

17. The machine-readable medium of claim 16, wherein the one or more measures for throttling power consumption of the at least one other core comprise at least one of a frequency reduction and a voltage reduction for the at least one other core.

18. The machine-readable medium of claim 14, wherein the plurality of measures for throttling power consumption of the first core includes reduction of at least one of a first core clock frequency of the first core and a first core operating voltage of the first core.

19. The machine-readable medium of claim 14, wherein the plurality of measures for throttling power consumption of the first core includes reduction of a duty cycle of the first core.

20. The machine-readable medium of claim 14, wherein the die-to-die conduit is a metal conductor included in the MCP.

* * * * *